(12) United States Patent
Schantz

(10) Patent No.: US 6,437,756 B1
(45) Date of Patent: Aug. 20, 2002

(54) SINGLE ELEMENT ANTENNA APPARATUS

(75) Inventor: Hans Gregory Schantz, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 20 days.

(21) Appl. No.: 09/753,244

(22) Filed: Jan. 2, 2001

(51) Int. Cl.$^7$ ................................................ H01Q 7/00
(52) U.S. Cl. ........................................ 343/866; 343/741
(58) Field of Search ................................ 343/702, 741, 343/743, 744, 866, 870

(56) References Cited

U.S. PATENT DOCUMENTS

| | | | |
|---|---|---|---|
| 4,641,317 A | | 2/1987 | Fullerton .......................... 375/1 |
| 4,743,906 A | | 5/1988 | Fullerton .......................... 342/27 |
| 4,813,057 A | | 3/1989 | Fullerton .......................... 375/37 |
| 4,979,186 A | | 12/1990 | Fullerton .......................... 375/23 |
| 5,227,621 A | * | 7/1993 | Kim et al. ..................... 250/214.1 |
| 5,363,008 A | | 11/1994 | Fullerton .......................... 342/27 |
| 5,677,927 A | | 10/1997 | Fullerton et al. ............. 375/200 |
| 5,687,169 A | | 11/1997 | Fullerton .......................... 370/324 |
| 5,832,035 A | | 11/1998 | Fullerton .......................... 375/210 |
| 5,838,283 A | * | 11/1998 | Nakano ........................... 343/741 |
| 5,847,683 A | * | 12/1998 | Wolfe et al. ................... 343/741 |
| 5,977,921 A | * | 11/1999 | Niccolai et al. ............... 343/741 |
| 6,091,374 A | * | 7/2000 | Barnes ........................... 343/767 |
| 6,133,876 A | * | 10/2000 | Fullerton et al. ............. 342/132 |
| 6,177,903 B1 | * | 1/2001 | Fullerton et al. ............... 342/21 |
| 6,218,979 B1 | * | 4/2001 | Barnes et al. .................. 342/22 |
| 6,259,416 B1 | * | 7/2001 | Qi et al. ....................... 343/725 |
| 6,297,773 B1 | * | 10/2001 | Fullerton et al. ............. 342/457 |
| 6,351,246 B1 | * | 2/2002 | McCorkle ....................... 343/786 |
| 6,351,652 B1 | * | 2/2002 | Finn et al. ..................... 455/462 |
| 6,354,946 B1 | * | 3/2002 | Finn ............................ 463/40 |

OTHER PUBLICATIONS

Henning F. Harmuth, "Nonsinusoidal Waves for Radar and Radio Communication," New York: Academic Press, 1981, pp. 108–110.

Agrawall, Narayan Prasad; Kumar, Girish; and Ray, K.P., "Wide–Band Planar Monopole Antennas"; IEEE Transactions on Antennas and Propagation; vol. 46, No. 2; Feb. 1998.

Gennadiy P. Pochanin, "Large Current Radiator fot the Short Magnetic Pulses Radiation," Ultra–Wideband, Short Pulse Electromagnetics vol. 4, Heyman et. al., ed.; New York: Plenum Publishers, 1999, p. 150.

Everett G. Farr, et. al., "A Two–Channel Balanced–Dipole Antenna (BNA) With Reversible Antenna Pattern Operating at 50 Ohms," Sensor and Simulation Notes#441, Air Force Research Laboratory, Dec. 1999.

Robert E. Collin, "Field Theory of Guided Waves," New York: McGraw–Hill Book Company, 1960, p. 272.

* cited by examiner

*Primary Examiner*—Don Wong
*Assistant Examiner*—Shih-Ihao Chen
(74) *Attorney, Agent, or Firm*—Law Office of Donald D. Mondul

(57) ABSTRACT

An antenna for transferring electromagnetic energy includes: (a) a ground element in a ground plane; (b) a transceiver element in a transceiver plane that intersects the ground element at a first end in a joint having a first terminus and a second terminus; and (c) a feed structure that conveys the electromagnetic energy intermediate the transceiver and the host device. A first transceiver edge departs from the joint in a first path in a first direction. A second transceiver edge departs from the joint in a second path in the first direction. Each edge includes at least a first edge sector having a first radius and a second edge sector having a second radius. The radii define a separation between the edge sectors. The first and second edge terminate in a terminal structure at a second end that is spaced from the ground element to establish a gap.

25 Claims, 22 Drawing Sheets

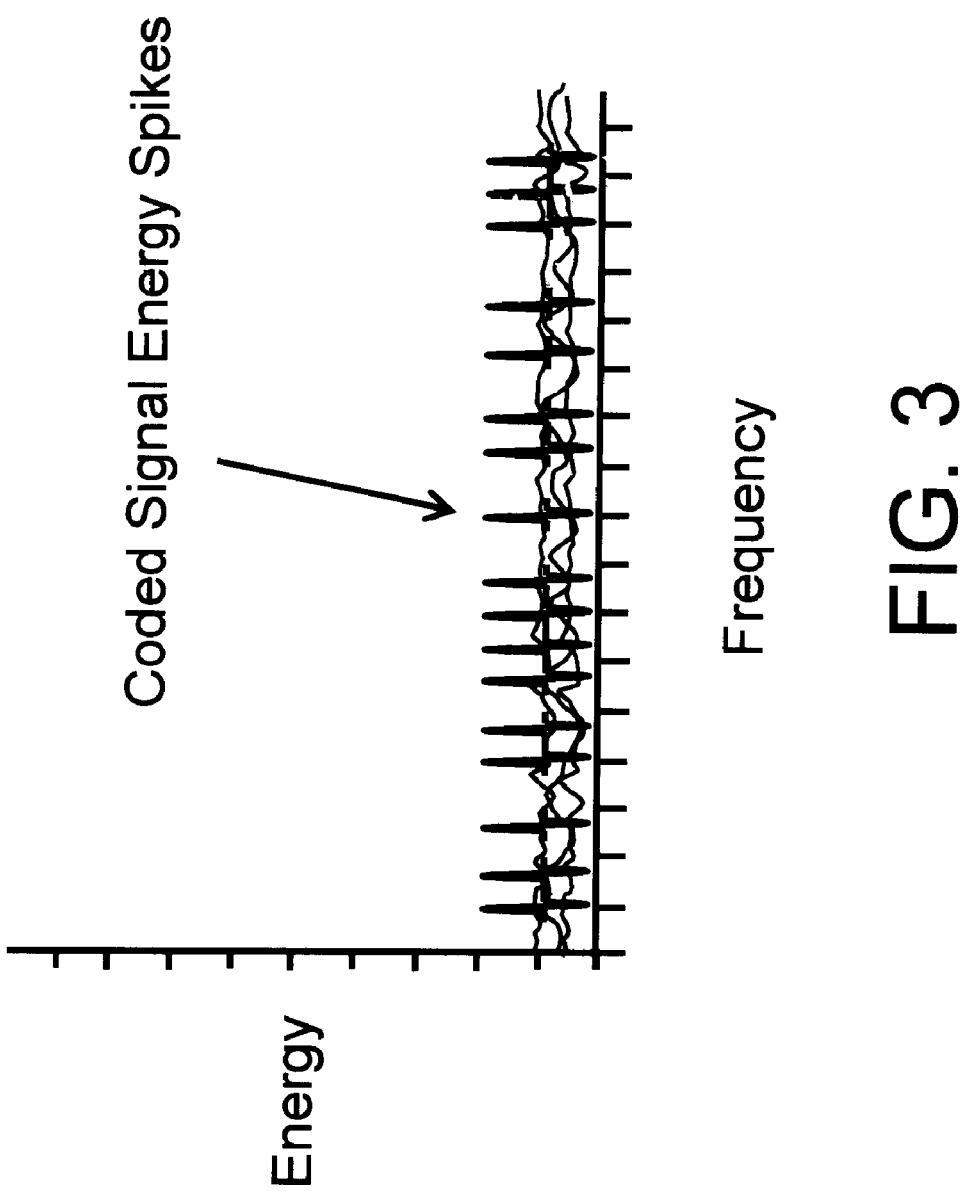

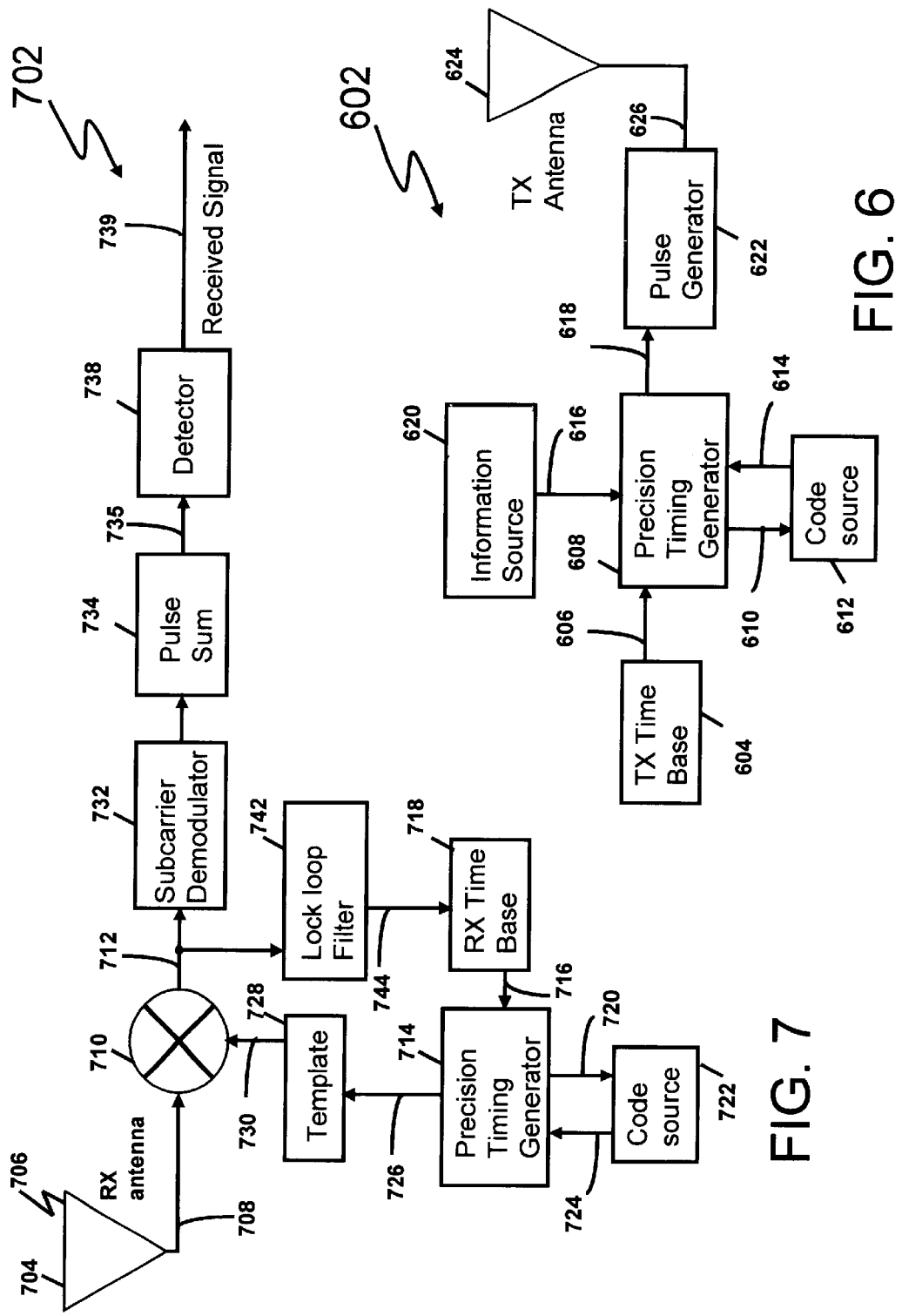

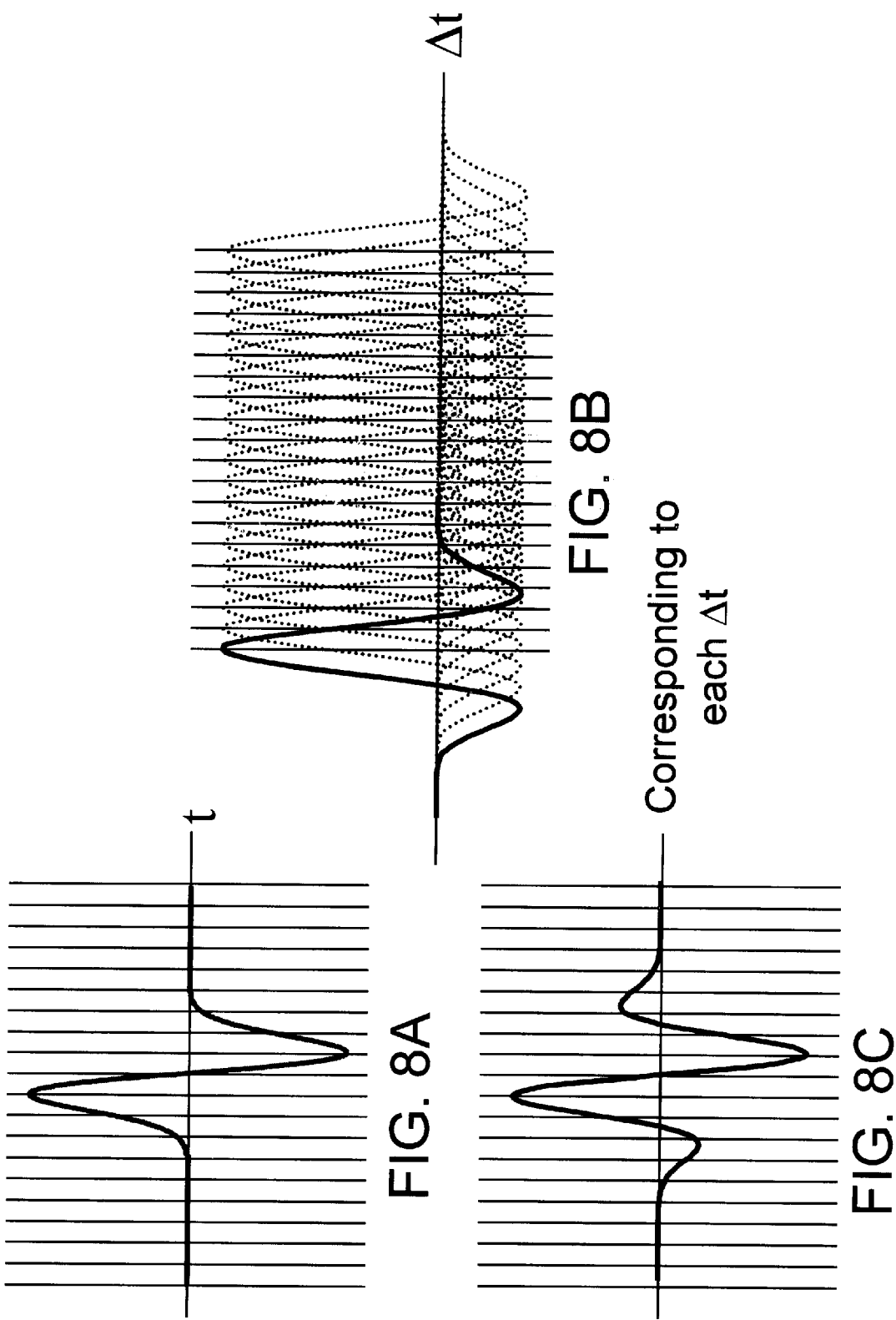

SINGLE ELEMENT ANTENNA APPARATUS

BACKGROUND OF THE INVENTION

1. Field of the Invention

The present invention relates generally to electromagnetic energy radiation and reception using a single element antenna, and especially relates to electromagnetic energy radiation and reception with a single element antenna effected using impulse radio energy. Still more particularly the present invention provides a single element antenna suited for broadband energy radiation and reception, and particularly well suited for broadband energy radiation and reception employing impulse radio energy.

2. Related Art

Recent advances in communications technology have enabled an emerging revolutionary ultra wideband technology (UWB) called impulse radio communications systems (hereinafter called impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array, " and U.S. patent application Ser. No. 09/332,503, entitled, "Wide Area Time Domain Radar Array, " both filed Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

Many applications for impulse radio technology, including communication applications, position determination applications, locating (e.g., radar) applications and other applications require lightweight, compact broadband antennas with broad beam transmit/receive characteristics. As with any antenna, impedance matching to feed elements is necessary for efficient operation. Moreover, in the case of impulse radio technology applications, the antenna must not be subject to ringing in response to application of pulses—either in a transmit mode or in a receive mode.

Current antenna technology offers several undesirable alternatives to one interested in a small, well-matched, efficient, broad beam ultra wideband (UWB) short pulse antenna: (1) a self-similar antenna (e.g., a spiral antenna) that tends to be large and frequency dispersive; (2) a TEM horn antenna that tends to be bulky and highly directive; or (3) a resistively loaded antenna that will necessarily be lossy and inefficient.

The current art regarding ultra wideband (UWB) antennas teaches using element antennas such as monopoles, dipoles, conical antennas and bow-tie antennas for ultra wideband systems. However, they are generally characterized by low directivity and relatively limited bandwidth unless either end loading or distributed loading techniques are employed, in which case bandwidth is increased at the expense of radiation efficiency.

Conventional antennas are designed to radiate only over the relatively narrow range of frequencies used in conventional narrow band systems. Such narrow band systems may, for example, employ fractional bandwidths no more than about 25%. If an impulse signal, such as a signal of the sort employed for impulse radio purposes, is fed to such a narrow band antenna, the antenna tends to ring. Ringing severely distorts signal pulses and spreads them out in time. Impulse radio signals are preferably modulated by pulse timing, so such distortion of pulses is not desirable.

Broadband antennas are advantageous for many purposes, including their use with impulse radio systems. Conventional design in broadband antennas follows a commonly accepted principle that the impedance and pattern properties of an antenna will be frequency independent if the antenna shape is specified only in terms of angles. That is to say, a self-similar or self-complimentary antenna will be a broadband antenna. This principle explains known broadband antennas like biconical and bow tie antennas, but also applies to other broadband antennas like log periodic, log spiral, and conical spiral antennas.

All such prior art antennas rely on a variation of scale to achieve their broadband performance. A "smaller" scale section of the antenna radiates higher frequency components while a "larger" scale section of the antenna radiates lower frequency components. Because the radiation centers change location as a function of frequency, these antennas are inherently frequency dispersive; they radiate different frequency components from different parts of the antenna, resulting in a distorted impulse signal.

Throughout this description, it should be kept in mind that discussions relating to transmitting or transmissions apply with equal veracity to reception of electromagnetic energy or signals. In order to avoid prolixity, the present description will focus primarily on transmission characteristics of antennas, with the proviso that it is understood that reception of energy or signals is also inherently described.

A biconical antenna is a classic example of a prior art broadband antenna with an omni-directional pattern. A typical biconical antenna with a 60° half angle will have a 100Ω input with a voltage standing wave ratio (VSWR) of <2:1 over a 6:1 bandwidth. A significant drawback with such a biconical antenna is that such an antenna is typically implemented with a diameter equal to the wavelength at the lower frequency limit ($\lambda_L$), thus requiring that the antenna be $0.577\lambda_L$ in height. Because of similar design limitations, a typical monocone antenna will not provide a good match if it is much less than $0.2\lambda_L$ in diameter. In any event, a monocone antenna does not have very stable performance over a broad band. In addition, such large antennas are difficult to fit into a small portable or hand held devices.

TEM horn antennas often suffer from frequency dispersion as well. Furthermore, a horn antenna is inherently a large structure, often several wavelengths in dimension. A horn antenna may be made smaller by dielectric loading, but such loading adds weight which is often undesirable. Further, a horn antenna is a highly directive antenna and cannot provide the less directive coverage required for many portable or mobile applications.

A TEM feed may be combined with a parabolic dish to create a ribbed horn "impulse radiating antenna" (IRA). Such antennas can have bandwidths on the order of a couple of decades, and very high gain, but their large size and high directivity make them inappropriate for portable or mobile use.

Because spherical antennas must be fed by a radial waveguide, they often exhibit poor matching characteristics unless an elaborate and difficult-to-manufacture impedance matching structure is used. A typical impedance matching structure also tends to further impair antenna performance by making the antenna more likely to ring. It is very difficult to construct a feed that maintains a constant matched impedance over a broad bandwidth, something essential to an ultra wideband (UWB) antenna. It is a commonly accepted design criteria in electromagnetic applications, and especially in radio communication applications, that an antenna should match a 50Ω impedance feed providing signals to (or receiving signals from) the antenna. Some video applications require matching a 75Ω impedance feed.

Another prior known antenna structure drives a hemispherical antenna against a ground plane. Attempts by the inventor to employ such an antenna structure for broadband impulse radio resulted in an unacceptably large impedance mismatch.

Circular disc (planar) single element antennas and elliptical disc (planar) single element antennas have been evaluated to determine their respective bandwidths. (Agrawall, Kumar and Ray; "Wide-Band Planar Monopole Antennas"; IEEE Transactions on Antennas and Propagation, February 1998.) However, no regard was given to the suitability of such antennas for impulse radio applications. No regard was given to dispersion, ringing or phase performance of signals employing such circular disc antennas or elliptical disc antennas for impulse radio communication.

Resistive loading is an alternate technique commonly employed to achieve impedance matching in broadband antennas. Resistive loading succeeds in reducing reflection, but at the cost of throwing away typically around half the power that may be transmitted by an antenna. Such a design trade-off has become accepted in design approaches in prior art antennas. It has been generally believed that resistive loading must be employed for a small broadband antenna in order to achieve good impedance matching. Non-resistively loaded small ultra wideband antennas are known, but they tend to have poor impedance matching and high voltage standing wave ratios (VSWR's). A lower value for VSWR is a better value; the optimum value of VSWR is 1:1. The prior art teaches that resistive loading must be used in an element antenna in order to achieve wide bandwidth. It is commonly believed that high radiation efficiency and high bandwidth are mutually exclusive.

Other single element planar antennas have been proposed. Henning Harmuth (Henning F. Harmuth, "Nonsinusoidal Waves for Radar and Radio Communication," New York: Academic Press, 1981, pp. 108–110.) presented a "large current dipole" (see FIG. 9). The underlying goal of Harmuth's antenna was to isolate the radiating currents on the loop from currents on the return behind the ground plane.

Variations on Harmuth's design have been proposed by Pochaninn (Gennadiy P. Pochanin, "Large Current Radiator for the Short Electromagnetic Pulses Radiation,"0 Ultra-Wideband, Short Pulse Electromagnetics Vol. 4, Heyman et. al., ed.; New York: Plenum Publishers, 1999, p. 150.), and Farr (Everett G. Farr, et. al., "A Two-Channel Balanced-Dipole Antenna (BNA) With Reversible Antenna Pattern Operating at 50 Ohms," Sensor and Simulation Notes #441, Air Force Research Laboratory, December 1999. Pochanin suggested employing a ferrite plate as a ground plane and providing a current carrying radiating element with a radius of curvature normal to the ground plane. Farr designed a structure incorporating a radius of curvature normal to the backplane, a broad planar aspect perpendicular with the radius of curvature and a load impedance intermediate the radiating element and the backplane. Both the Pochanin and Farr designs use lossy materials—Pochanin's ferrite backplane and Farr's load impedance—to achieve their design goals. Neither of the Pochanin or Farr antennas uses a simple conducting loop terminated against a ground plane as contemplated by the present invention.

A loop structure has been employed in exciting modes in a waveguide (see, Robert E. Collin, "Field Theory of Guided Waves," New York: McGraw-Hill Book Company, 1960, p. 272.) but the structure is limited to a simple wire structure that would not be an effective broadband radiator.

The art, therefore, offers several undesirable alternatives to a small, well-matched, efficient, broad beam ultra wideband (UWB) short pulse antenna: (1) a self similar antenna tends to be large and frequency dispersive; (2) a TEM horn or Vivaldi slot antenna tends to be bulky and highly directive; (3) a resistively loaded antenna that is lossy and inefficient; or (4) narrow-band devices designed to excite particular waveguide modes For a small hand held or portable system, it is desirable to have a well matched, efficient, physically small, UWB antenna that radiates non-dispersively and with a broad beam. It is particularly advantageous for an antenna to be easily made in large volumes with reliable repeatable quality. Not only are such antennas unknown to the present art, in fact, the current teaching is that such antennas are not physically realizable.

Larger devices than portable or hand-held products may also enjoy advantages from well matched, efficient and physically small UWB antenna apparatuses. For example, a UWB radar device may be more efficiently, more quickly and more conveniently located for field operations if it involves a compact antenna that exhibits efficient matching and operating characteristics.

An array of single element antennas for use in radar imaging or motion detection should employ single element antennas with patterns that are substantially similar to the desired field of view of the complete radar system. In the particular case of a radar detection device, it is most preferable that single element antennas have a wide field of view in the horizontal direction and a more narrow field of view in the vertical direction. It is also preferable if such radar-employed antenna elements have a horizontal polarity.

There is thus a need for a broadband single element antenna that has ultra wideband response, is compact, is efficiently matched to a feed structure and radiates with a beam that is horizontally polarized and broad in the horizontal direction and more narrow in the vertical direction.

In particular, there is a need for such a broadband single element antenna that operates without ringing in response to application of a pulse signal.

SUMMARY OF THE INVENTION

An antenna for transferring electromagnetic energy intermediate a host device and a medium substantially adjacent to the antenna includes (a) a ground element preferably generally coplanar with a ground plane; and (b) a substantially planar transceiver element generally coplanar with a transceiver plane. The transceiver element intersects the ground element at a first end in a joint that has a first terminus and a second terminus. A first edge of the transceiver departs from the first terminus in a first arcuate path in a first direction from the ground plane. A second edge of the transceiver departs from the second terminus in a second arcuate path generally in the first direction. The first edge and the second edge each include at least one arc-set. Each respective arc-set includes a first arc having a first radius describing a respective first edge sector of the first edge and a second arc having a second radius describing a respective second edge sector of the second edge. The first radius and the second radius define a transverse separation between the first edge sector and the second edge sector. The first edge and the second edge terminate in a terminal structure at a second end distal from the first end. The terminal structure is in spaced relation with respect to the ground element to establish a gap intermediate the transceiver and the ground element. The antenna also includes (c) a feed structure. The feed structure conveys the electromagnetic energy intermediate the transceiver and the host device.

Preferably the antenna of the present invention is configured as a layer of copper arranged upon a dielectric substrate to form a generally planar transceiving element that is affixed to a generally planar ground plane. The plane of the transceiver element is preferably substantially perpendicular with the plane of the ground element. The thickness of the dielectric substrate may be advantageously altered to adjust the speed of signal propagation in elements supported by the dielectric material.

An energy guiding means is preferably embodied in a structure that conveys electromagnetic energy. Examples of an energy guiding means include, by way of illustration and not by way of limitation, coaxial cable, stripline, microstrip, twin lead, twisted pair fiber optic cable, wave guide or other transmission line, or a connector or coupler that enables connection to a transmission line.

An energy channeling structure is preferably embodied in a structure that couples electromagnetic energy between an apparatus and an adjacent free space or medium. Examples of a channeling structure include, by way of illustration and not by way of limitation, radiating elements, receiving elements, reflectors, directors and horns.

A transition means is preferably embodied in a structure that receives radio frequency (RF) energy, transmits RF energy or receives and transmits RF energy. The terms "feed" or "feed region" are sometimes used to refer to a transition means.

A host radio is a RF device that receives RF energy, transmits RF energy or receives and transmits RF energy. An antenna may be integrally included with or within a host radio or that antenna may be situated remotely from the host radio at an arbitrary distance yet coupled with the host radio, such as by using an energy guiding means. The term "host radio" does not per se indicate any particular relation between a radio and an associated antenna. In particular, the term "host radio" does not preclude an antenna remotely located from a radio or standing alone with respect to a radio.

The term "host device" intentionally indicates an element that may be embodied in other than a radio. Examples of host devices other than radios include, for example, radar devices, location transducer devices, and other devices employing electromagnetic energy transmitted, received or transmitted and received using an antenna.

The present invention is embodied in antennas having a structure characterized by the inventor as "monoloop" antennas. Monoloop antennas are planar single element antennas that are preferably well matched to the standard 50 Ω impedance design parameter employed in communication apparatuses. Monoloop antennas are efficient, physically small and radiate in a broad beam pattern. Such antennas exhibit some spatial dispersion, but they emit a waveform that is relatively short and non-temporally dispersive.

Monoloop antennas generally include a planar radiating loop, a ground plane reflector and a feed structure for providing signals between the antenna and a host device.

A planar radiating loop is preferably a generally planar, approximately semi-circular arc of a suitable conducting material. The plane in which the planar radiating loop is oriented is preferably normal to the plane of the ground plane. The preferred typical shape of the radiating loop is close to circular, but various elliptical, ovoidal, Archimedian and log spiral shapes may also be employed to advantage. It is important to note that the present invention is configured in contrast to teaching of the prior art relating to antenna construction. Rather than being configured to block or minimize reflection from the ground plane, the present invention is oriented to take advantage of the reflections from the ground plane.

The ground plane of the present invention is preferably a suitably conductive sheet that reflects energy from the planar radiating loop. Preferably, the ground plane is a flat conducting plane. A variety of alternate configurations are also useful including a cylindrical reflector, a parabolic reflector, a hyperbolic reflector or a corner reflector.

The feed structure of the present invention includes a transmission line or other energy guiding means, a gap of an appropriate size and a preferably blunt gap intersection or interface intermediate the planar radiating loop and the underlying ground plane. Gap interfaces having smaller diametral dimensions (i.e., less blunt, more pointed configurations) may be employed, but such less blunt gap interface structures present higher input impedance that can be on the order of 100Ω–150Ω.

It is therefore an object of the present invention to provide an apparatus for transferring electromagnetic energy intermediate a host device and a medium adjacent to the apparatus that is efficient in operation and easy to manufacture in production level quantities.

It is a further object of the present invention to provide an apparatus for transferring electromagnetic energy intermediate a host device and a medium adjacent to the apparatus that is compact and is matched to a feed structure.

It is yet a further object of the present invention to provide an apparatus for transferring electromagnetic energy intermediate a host device and a medium adjacent to the apparatus that radiates a broad beam pattern.

It is a still further object of the present invention to provide an apparatus for transferring electromagnetic energy intermediate a host device and a medium adjacent to the apparatus that operates without ringing in response to application of a pulse signal.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 3 illustrates the frequency domain amplitude of a sequence of time coded pulses.

FIG. 6 illustrates a representative impulse radio transmitter functional diagram.

FIG. 7 illustrates a representative impulse radio receiver functional diagram.

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B.

DETAILED DESCRIPTION OF THE EMBODIMENTS

Overview of the Invention

Figure 1B:
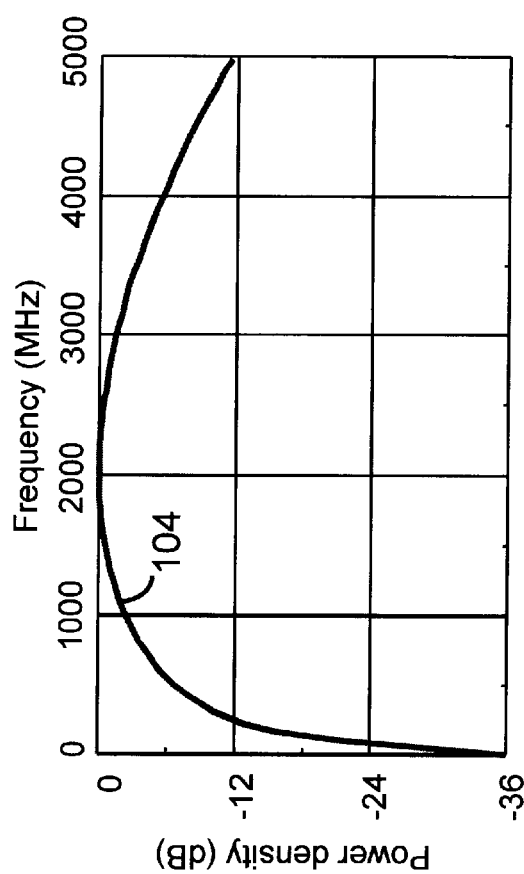
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
$\sigma$ is a time scaling parameter,
t is time,
$f_{mono}(t)$ is the waveform voltage, and
e is the natural logarithm base.

Figure 1A:
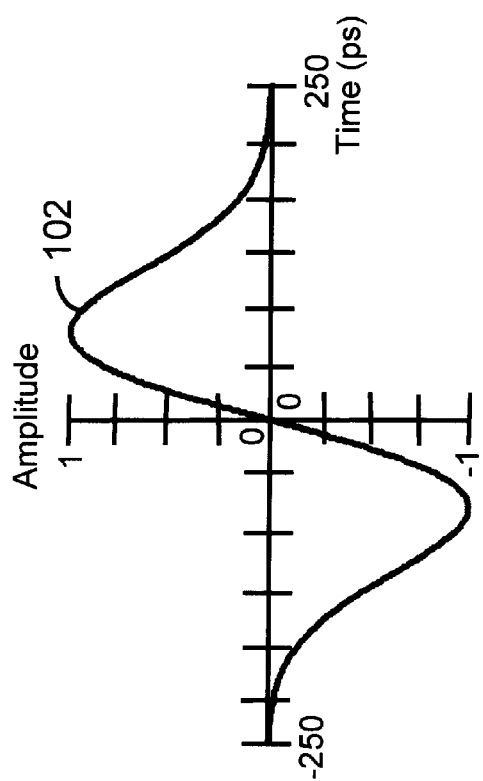
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{3/2}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
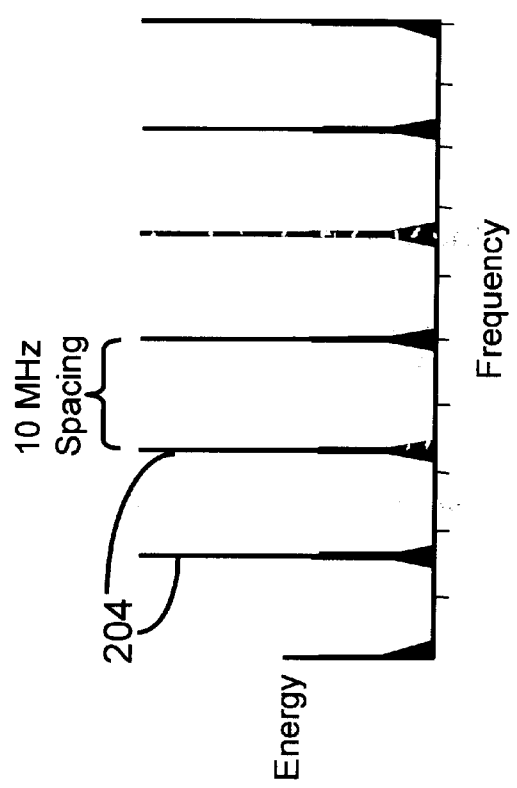
FIG. 2B illustrates the frequency domain amplitude of the waveform of FIG. 2A.
Figure 2A:
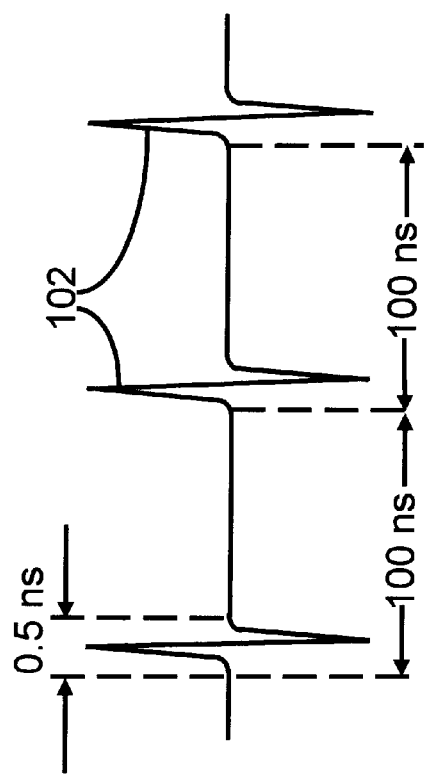
FIG. 2A illustrates a pulse train comprising pulses as in FIG. 1A.

Prototypes have been built having pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
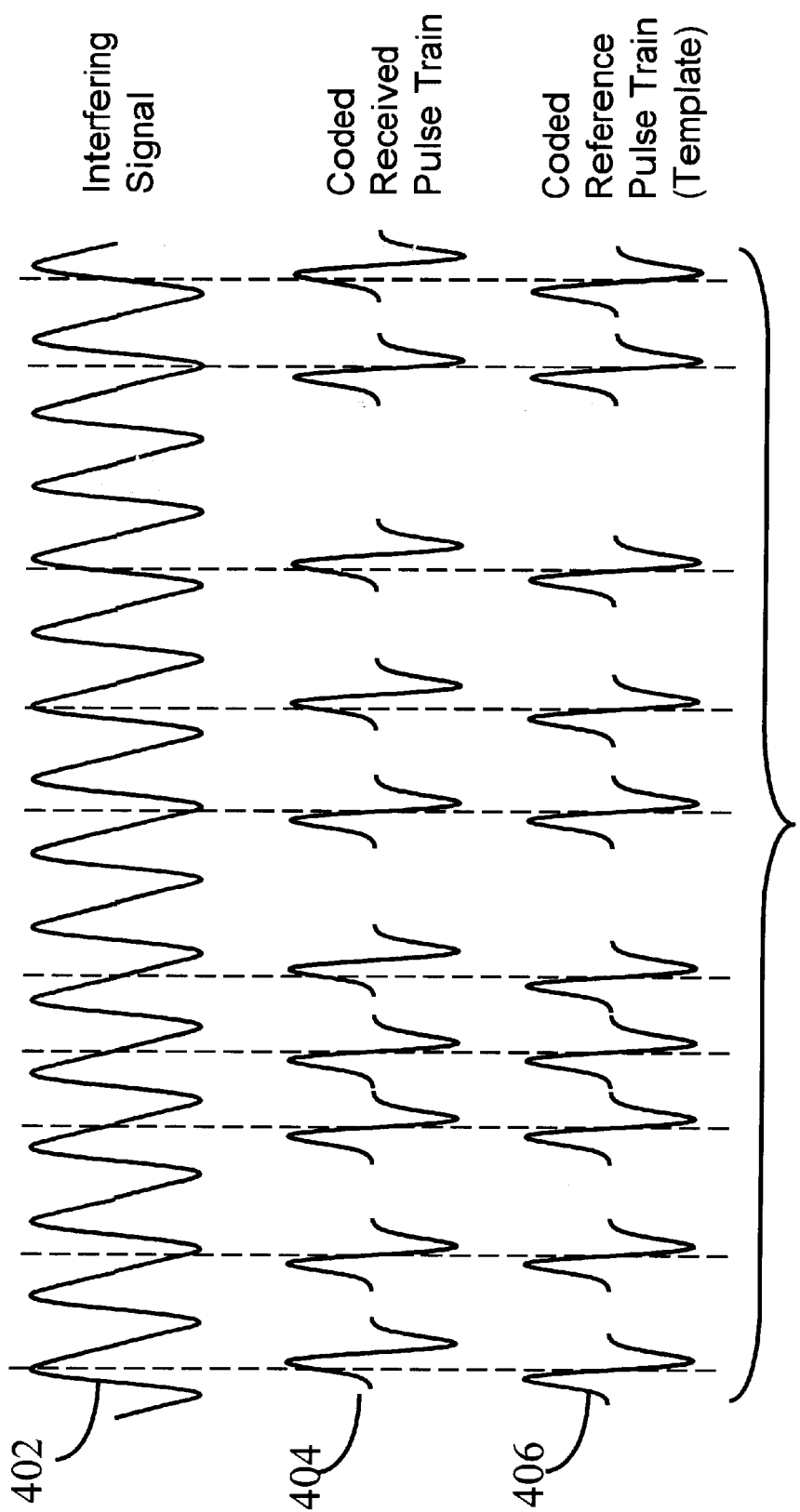
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultra wideband impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200, 000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5A:
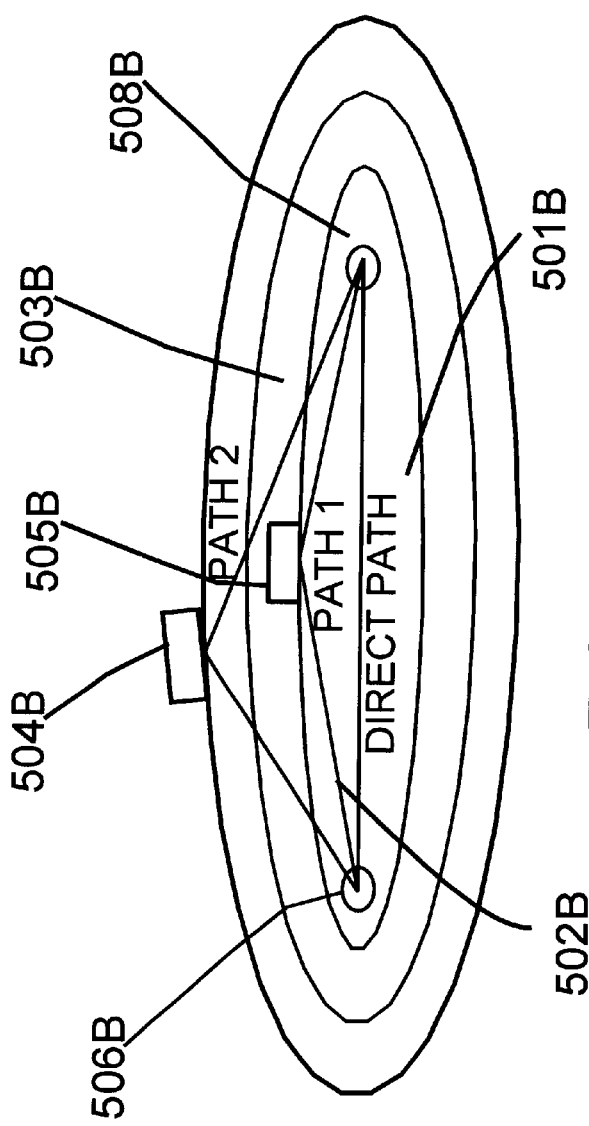
FIG. 5A illustrates a typical geometrical configuration giving rise to multipath received signals.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
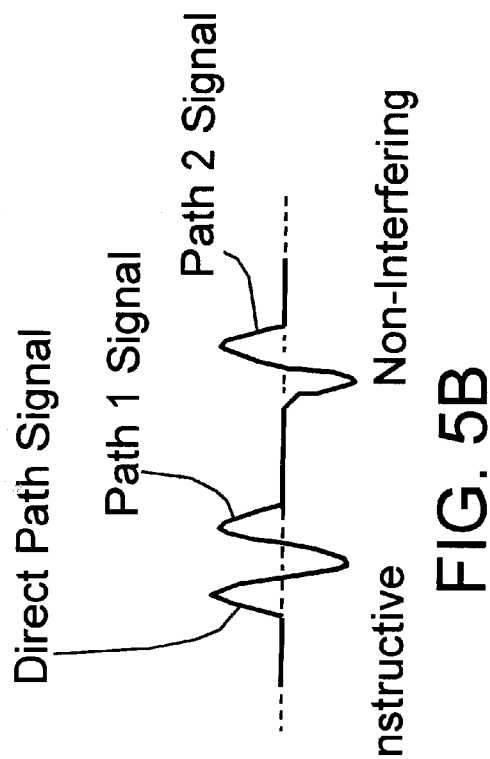
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
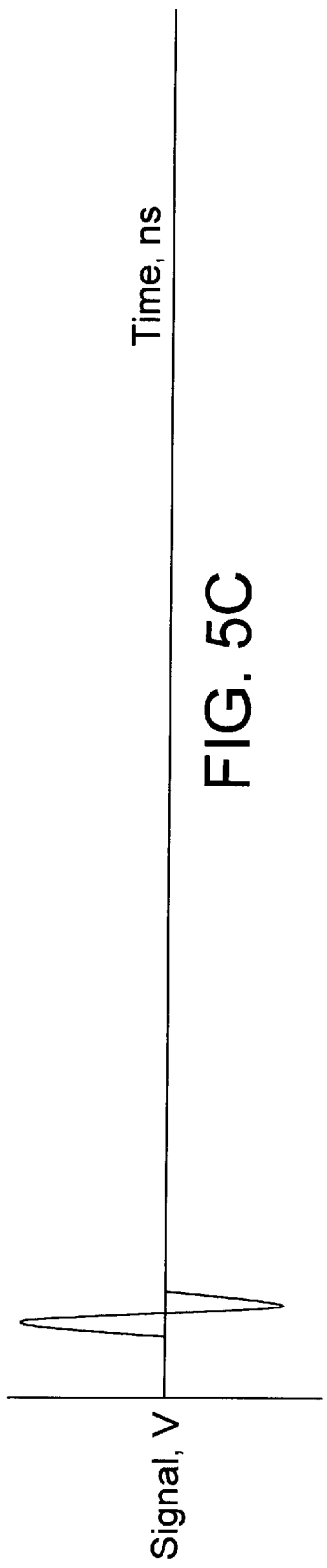
FIGS. 5C–5E illustrate a signal plot of various multipath environments.
Figure 5D:
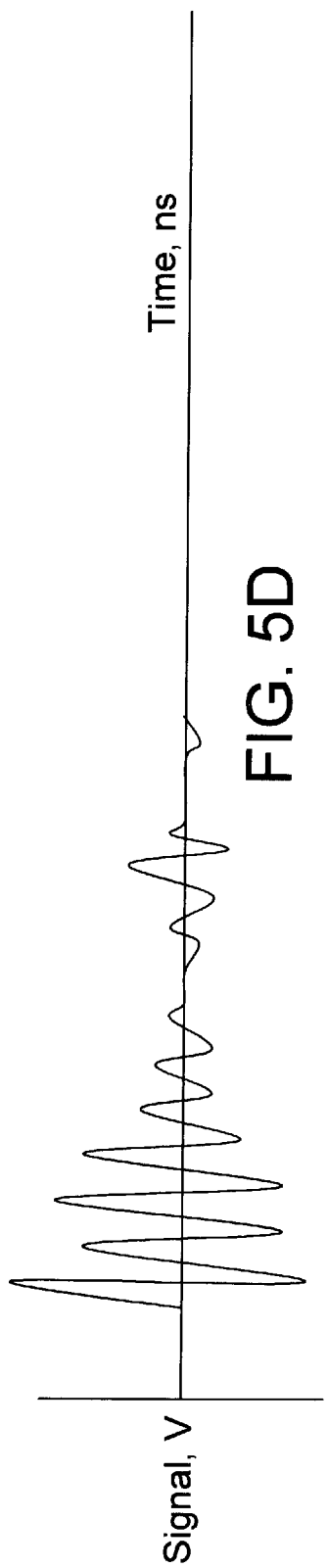
Figure 5E:
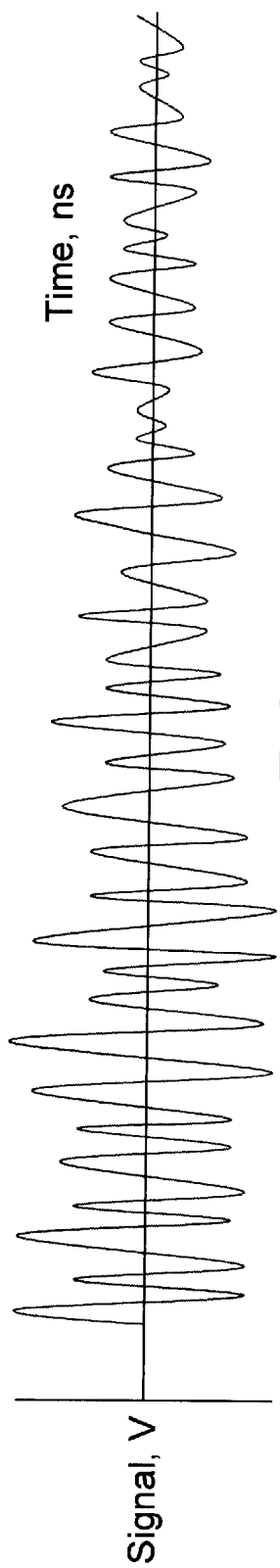

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be canceled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2}\sigma$ is the RMS amplitude of the combined multipath signals.

Figure 5F:
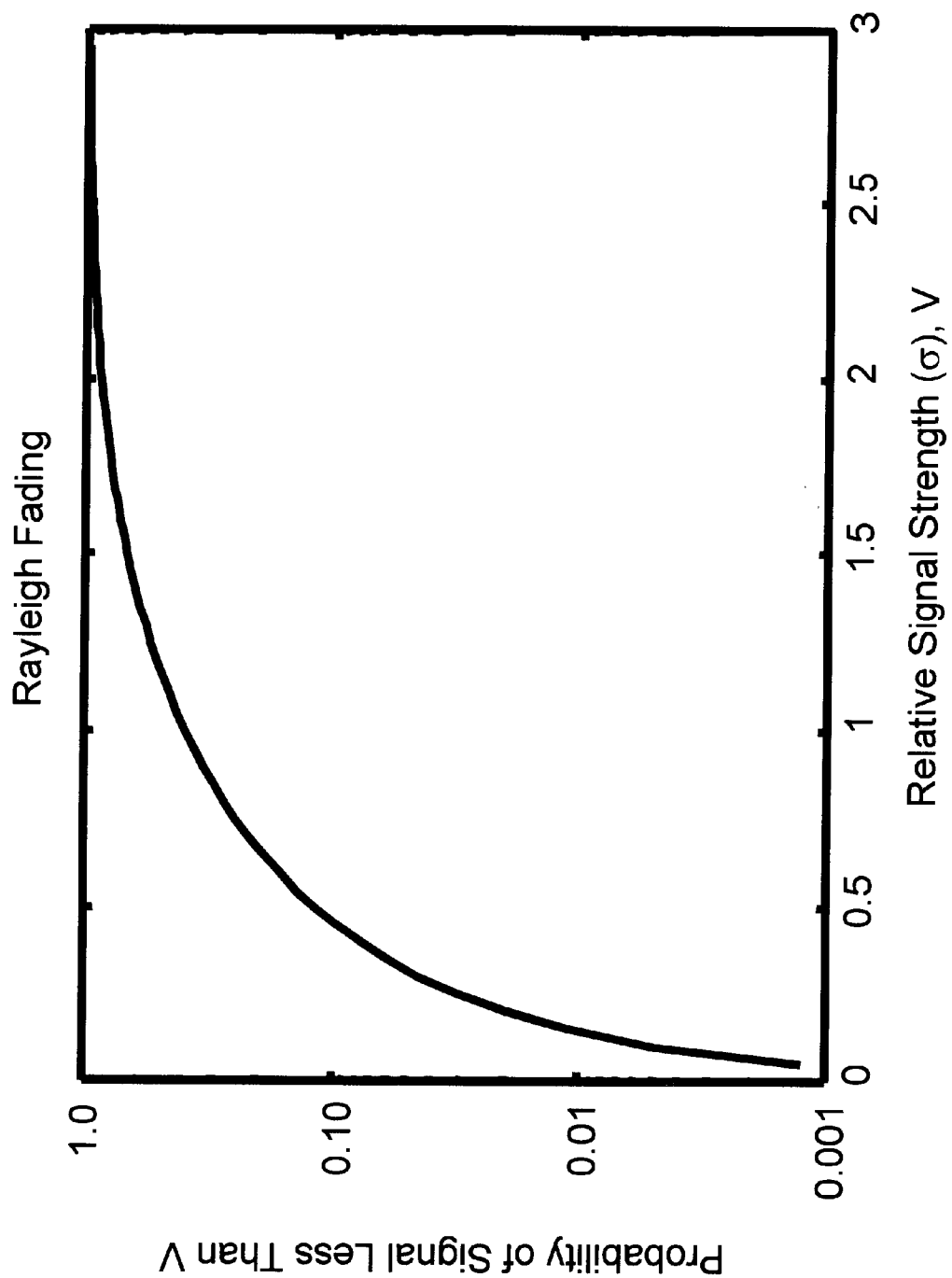
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
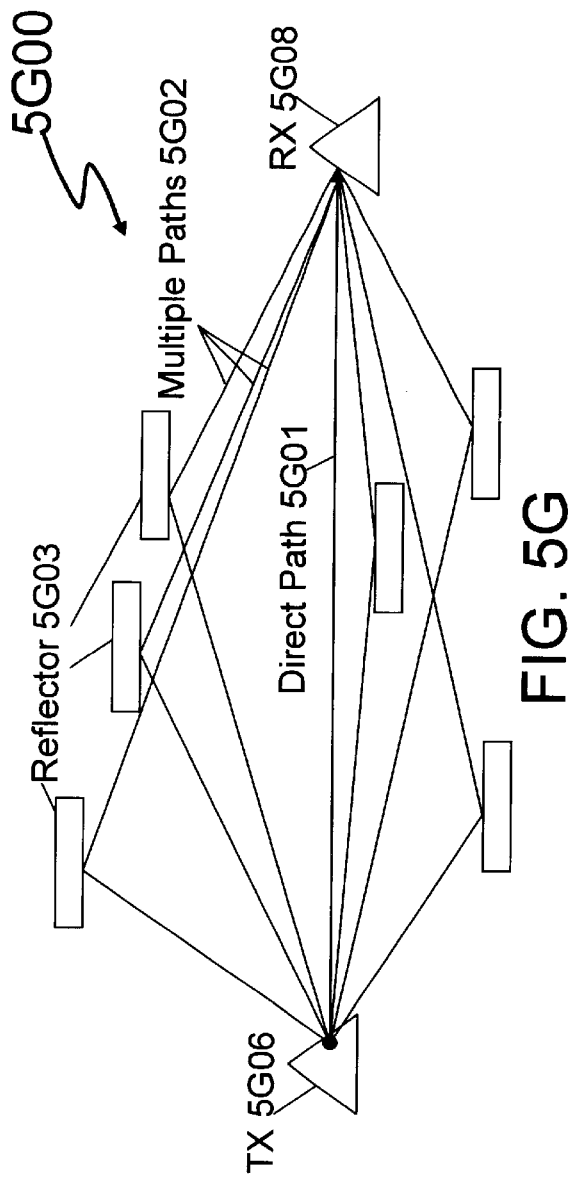
FIG. 5G illustrates a plurality of multipaths with a plurality of reflectors from a transmitter to a receiver.
Figure 5H:
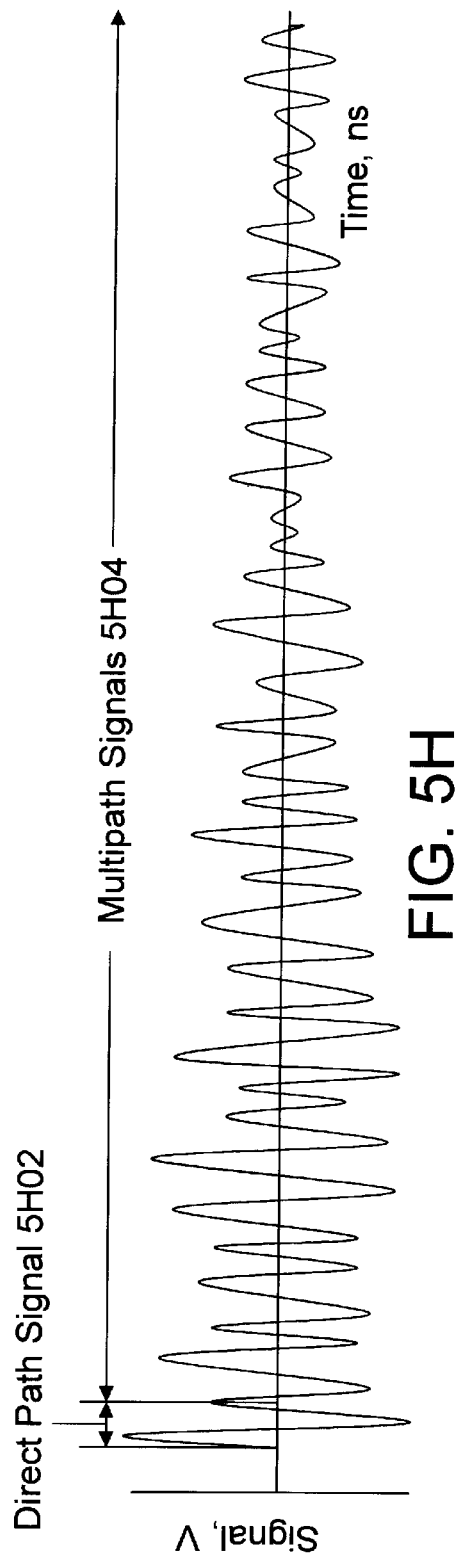
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. Systems have been built that have shown the potential for centimeter distance resolution, which is equivalent to about 30 ps of time transfer resolution. See, for example, commonly owned, co-pending applications Ser. Nos. 09/045,929, filed Mar. 23, 1998, titled "Ultrawide-Band Position Determination System and Method", and 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultra wideband, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned patents U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets.

FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sept. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. The present invention is particularly valuable when used in a radio network employing impulse radio; the present invention is compact and exhibits efficient broad beam non-dispersive radio transmission and receive characteristics with reduced ringing in the presence of impulse signals.

DETAILED DESCRIPTION OF THE PREFERRED EMBODIMENT

A vital component for any radio communication system is the antenna system or systems employed for transmitting and receiving radio frequency (RF) signals. Generally, characteristics that relate to good transmitting quality for a particular antenna apply with equal relevance to receiving characteristics of the antenna. Characteristics that are preferably optimized for antennas employed with an impulse radio communication system are that the antennas should be a broadband antenna that is small and compact, well-matched (preferably impedance-matched with a 50 ohm load), efficient without a propensity for ringing when subjected to pulsed signals, non-dispersive in its transceiving operations, and having a field of view appropriate for the desired application. From a practical standpoint, an antenna system should be easy to make with reliable quality in production volumes (as contrasted with volumes appropriate for prototype manufacture).

The present invention is embodied in antennas having a structure characterized by the inventor as "monoloop" antennas. Monoloop antennas are planar single element antennas that are preferably well matched to the standard 50Ω impedance design parameter employed in communication apparatuses. Monoloop antennas are efficient, physically small and radiate in a broad beam pattern. Such antennas exhibit some spatial dispersion, but they emit a waveform that is relatively short and non-temporally dispersive.

Monoloop antennas generally include a planar radiating loop, a ground plane reflector and a feed structure for providing signals to the antenna from a host device. A planar radiating loop is preferably a generally planar, approximately semi-circular arc of a suitable conducting material. The plane in which the planar radiating loop is oriented is preferably normal to the plane of the ground plane. The preferred typical shape of the radiating loop is close to circular, but various elliptical, ovoidal, Archimedian and log spiral shapes may also be employed to advantage. It is important to note that the present invention is configured in contrast to teaching of the prior art relating to antenna construction. Rather than being configured to block or minimize reflection from the ground plane, the present invention is oriented to take advantage of the reflections from the ground plane.

Figure 9:
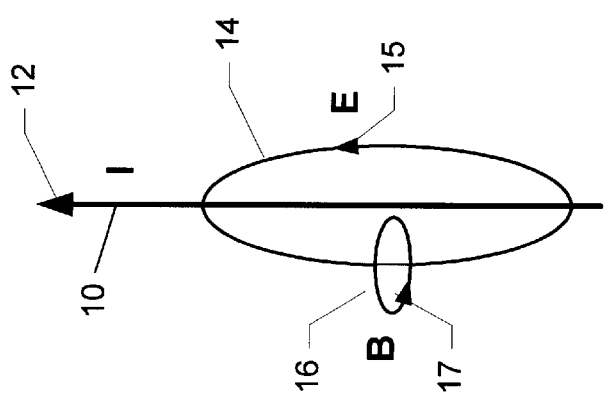
FIG. 9 illustrates a vertically oriented current-carrying conductor with its associated electric radiation field and magnetic radiation field.

FIG. 9 illustrates a vertically oriented current-carrying conductor with its associated electric radiation field and magnetic radiation field. In FIG. 9, an electrical conductor 10 is oriented vertically and carries an electrical current that changes with respect to time at a rate dI/dt while flowing in a direction indicated by an arrow 12 to create an electric radiation field 14. Electric radiation field 14 is created in a vertical orientation; a magnetic radiation field 16 is also created in a horizontal orientation. Electric radiation field 14 has a radiation field strength E and is vectorally oriented as indicated by arrows 15 in FIG. 9. Magnetic radiation field 16 has a radiation field strength H and is vectorally oriented about electrical conductor 10 as indicated by an arrow 17 in FIG. 9.

Figure 10:
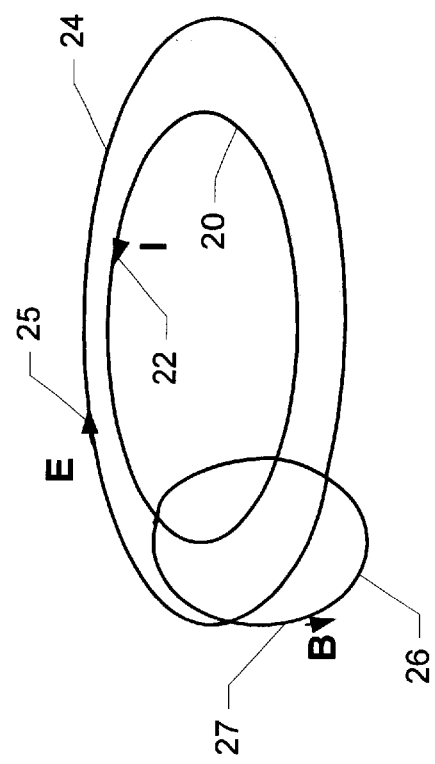
FIG. 10 illustrates a horizontally oriented current-carrying conductor with its associated electric radiation field and magnetic radiation field.

FIG. 10 illustrates a horizontally oriented current-carrying conductor with its associated electric radiation field and magnetic radiation field. In FIG. 10, an electrical conductor 20 is oriented horizontally and carries an electrical current that changes with respect to time at a rate dI/dt while flowing in a direction indicated by an arrow 22 to create an electric radiation field 24. Electric radiation field 24 is created in a horizontal orientation; a magnetic radiation field 26 is also created in a vertical orientation. Electric radiation field 24 has a radiation field strength E and is vectorally oriented as indicated by an arrow 25 in FIG. 10. Magnetic radiation field 26 has a radiation field strength H and is vectorally oriented as indicated by an arrow 27 in FIG. 10.

Figure 11:
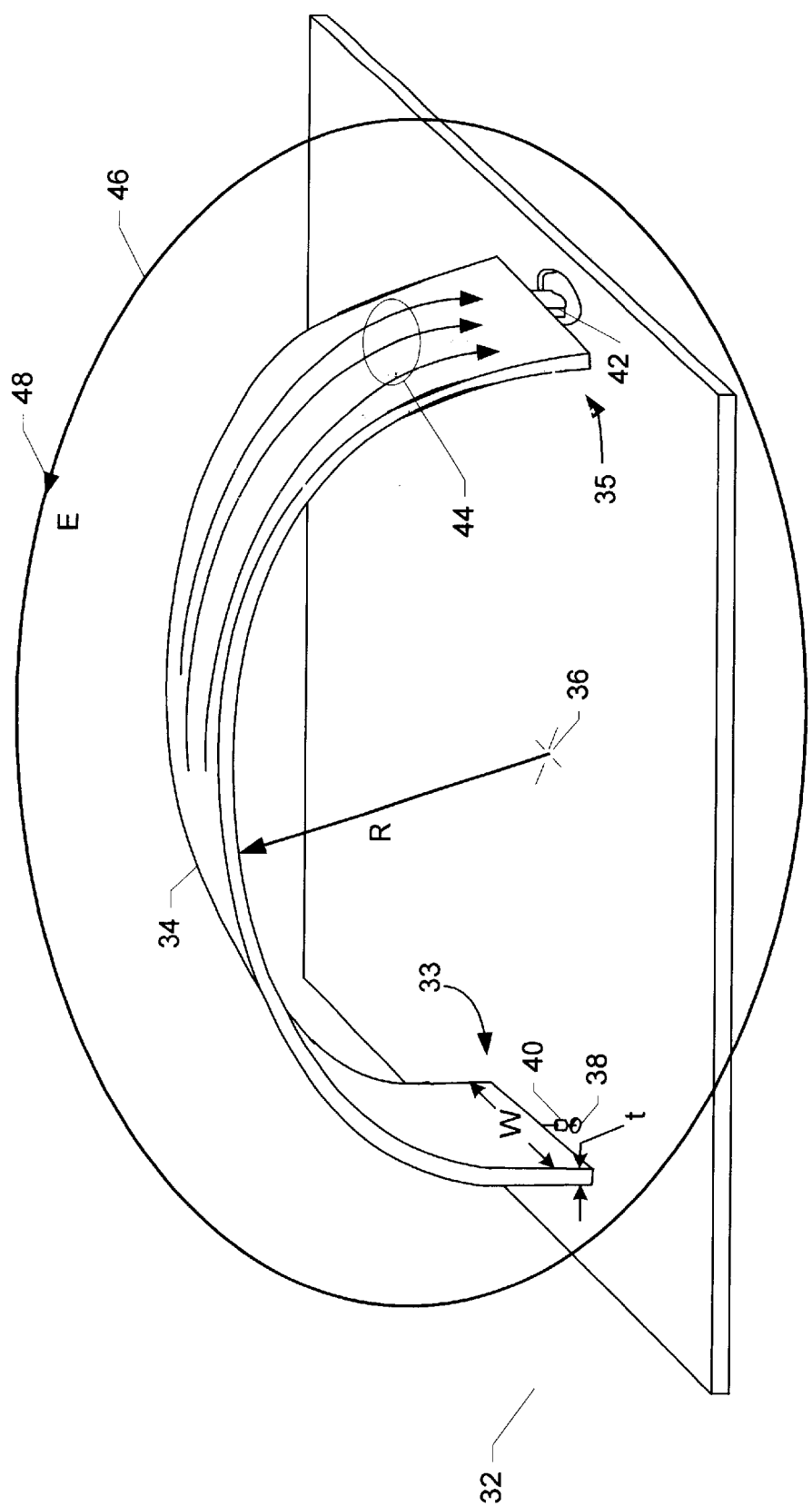
FIG. 11 illustrates a representative prior art single element antenna structure with its associated electric radiation field.

FIG. 11 illustrates a representative prior art single element antenna structure with its associated electric radiation field. The antenna structure represented in FIG. 11 is an example of the "balanced dipole antenna" described by Farr (Everett G. Farr et al, "A Two-Channel Balanced-Dipole Antenna (BDA) With Reversible Antenna Pattern Operating at 50 Ohms", Sensor and Simulation Notes #441, Air Force Research Laboratory, December 1999). In FIG. 11, an antenna apparatus 30 includes a ground element 32 and a transceiving element 34. Transceiving element 34 has a thickness t that is significantly smaller than its width W. Transceiving element 34 is thus a planar element oriented in an arcuate arrangement having a radius R from a center 36 that is located substantially at ground element 32. Radius R is substantially perpendicular with the plane of transceiving element 34 throughout the length of transceiving element 34. Transceiving element 34 is electrically connected with ground element 32 at a first end 33 of transceiving element 34. The attachment is effected at an attachment locus 38 via a load impedance 40. A second end 35 of transceiving element 34 includes a feed structure 42 by which transceiving element 32 conveys signals with a host device (not shown in FIG. 11) during operation. During such operation, current may flow in transceiving element 32 alternately in the directions indicated by arrows 44. Changing current flowing in the directions indicated by arrows 44 will support an electric radiation field 46 having a radiation field strength E in a vertical orientation vectorally directed alternately as indicated by arrows 48.

Figure 12:
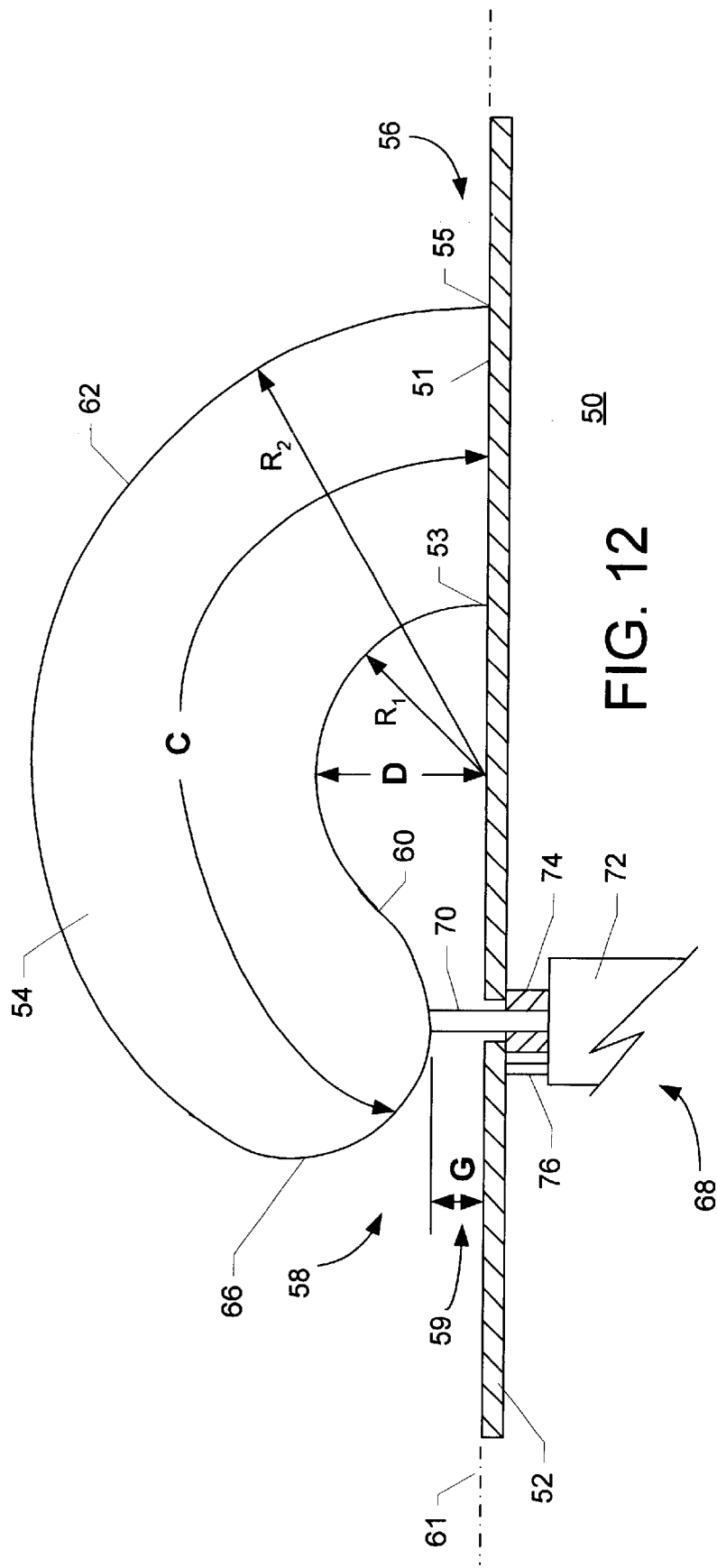
FIG. 12 is a side elevation view of a single element antenna according to the preferred embodiment of the present invention.

FIG. 12 is a side elevation view of a single element antenna according to the preferred embodiment of the present invention. In FIG. 12, an antenna apparatus 50 includes a ground element 52 and a transceiver element 54. Transceiver element 54 is affixed to ground element 52 at a first end 56 of transceiver element 54. Transceiver element 54 is spaced from ground element 52 by a gap 59 having a gap distance G at a second end 58 of transceiver element 54.

Transceiver element 54 is preferably substantially planar in a transceiver plane (not shown in FIG. 12) substantially containing transceiver element 54. Ground element 52 is preferably substantially planar in a ground plane 61 substantially containing ground element 52. Preferably, transceiver element 54 is configured as a layer of copper arranged upon a dielectric substrate to form generally planar transceiving element 54 that is affixed to a generally planar ground plane.

Transceiver element 54 intersects ground element 52 in a joint 51 bounded by a first terminus 53 and a second terminus 55. Preferably, transceiver element 54 and ground element 52 are perpendicular. Transceiver element 54 is bounded by a first edge 60 and a second edge 62 in the transceiver plane. First edge 60 departs in a departure direction from first terminus 53 at ground element 52 and is generally defined by a radius $R_1$. Second edge 62 departs in the same departure direction from second terminus 55 at ground element 52 and is generally defined by a radius $R_2$. There is thus defined a separation distance between first edge 60 and second edge 62 having the dimension $(R_2-R_1)$. First edge 60 and second edge 62 terminate in a termination structure 66 at second end 58. Preferably, termination structure 66 is an arc-section that joins first edge 60 with second edge 62. Preferably, termination structure 66 has a diameter at least equal to $(R_2-R_1)$. A larger separation distance $(R_2-R_1)$ permits a greater broadband operating capability for transceiver element 54.

Termination structure 66 is coupled with a feed structure 68. Preferably, feed structure 68 is a coaxial feed arrangement for conveying signals to and from transceiver element 54. Feed structure 68 may be embodied in other configurations such as, by way of illustration and not by way of limitation, coaxial cable, stripline, microstrip, twin lead, twisted pair fiber optic cable, wave guide or other transmission line, or any connector or coupler that enables connection to a transmission line.

Feed structure 68 preferably includes a signal carrying conductor 70 surrounded by a shield 72 with an insulator 74 intermediate conductor 70 and shield 72. A ground connection 76 is established intermediate shield 72 and ground element 52 when feed structure 68 is installed.

As thus configured, antenna apparatus 50 defines a separation distance D between ground element 52 and the maximum excursion of first edge 60 from ground element 52. In the preferred embodiment of the invention illustrated in FIG. 12, separation distance D is equal to radius $R_1$. Another dimension established for antenna apparatus 50 is circumferential path C. As illustrated in FIG. 12, circumferential path C is the generally arcuate path a signal must pass along when traversing transceiver element 54 during operation as a transmitter or a receiver in operation.

It is important that circumferential path C be an appropriate length vis-à-vis the wavelength of signals accommodated by transceiver element 54 during operation. Preferably, circumferential path C should be approximately equal with one-quarter the wavelength of frequencies handled by transceiver element 54. By ensuring such a relation between circumferential path C and wavelength, first end 56 and second end 58 will not be in phase and will not have a mutual cancellation effect during operation.

Figure 13:
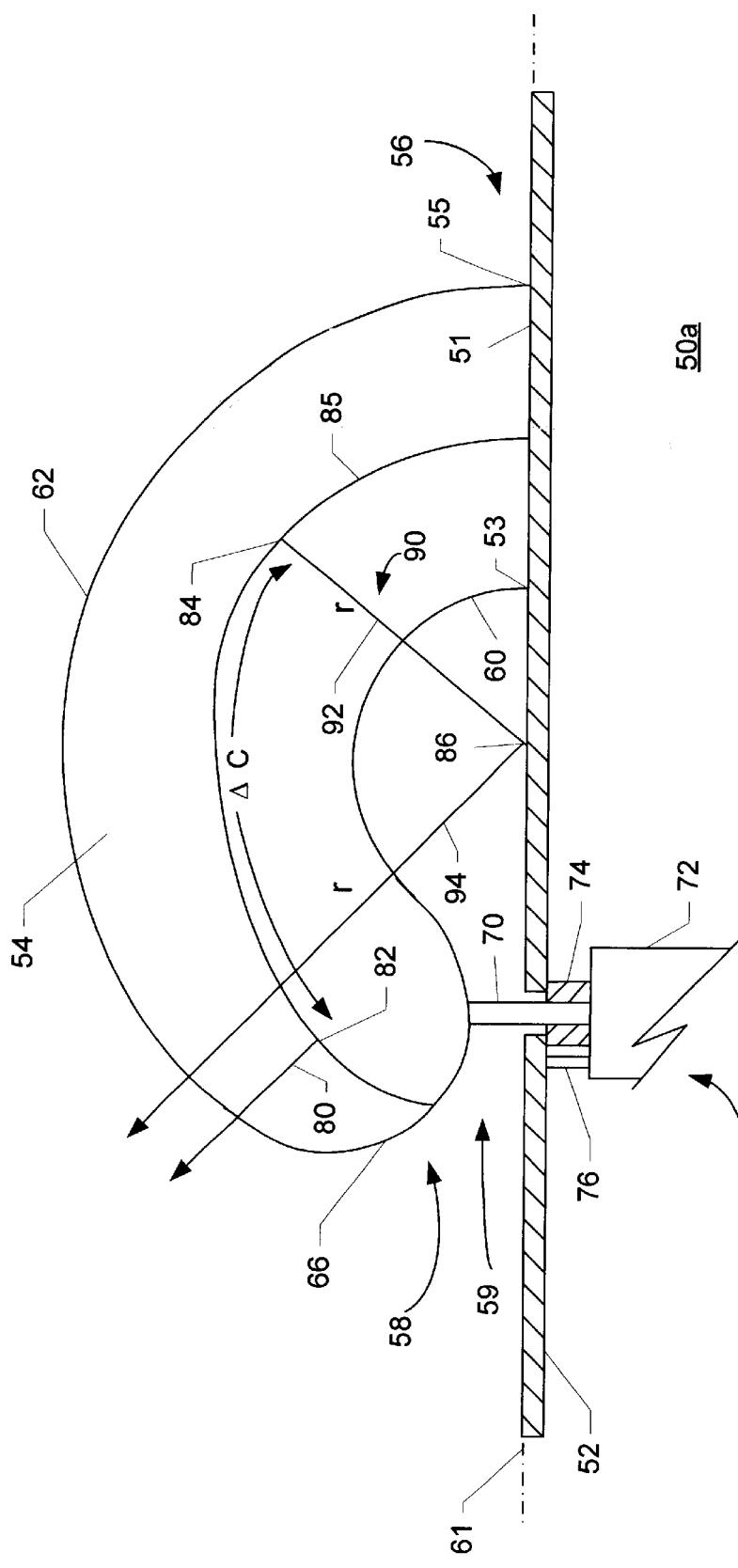
FIG. 13 is a plan view of the single element antenna illustrated in FIG. 12, illustrating a first representative set of signal transmission paths.

FIG. 13 is a plan view of the single element antenna illustrated in FIG. 12, illustrating a first representative set of signal transmission paths. In FIG. 13, an antenna apparatus 50a includes a ground element 52 and a transceiver element 54. Transceiver element 54 is affixed to ground element 52 at a first end 56 of transceiver element 54.

Transceiver element 54 is spaced from ground element 52 at a second end 58 of transceiver element 54 to establish a gap 59 intermediate ground element 52 and transceiver element 54.

Transceiver element 54 is preferably substantially planar in a transceiver plane (not shown in FIG. 13) substantially containing transceiver element 54. Preferably, transceiver element 54 is configured as a layer of copper arranged upon a dielectric substrate to form generally planar transceiver element 54. Ground element 52 is preferably substantially planar in a ground plane 61 substantially containing ground element 52. Transceiver element 54 is bounded by a first edge 60 and a second edge 62 in the transceiver plane.

A first signal path 80 emanates from transceiver element 54 (for illustration purposes) from a locus 82 generally in the middle of transceiver element 54. A second signal path 90 emanates from a locus 84, also generally in the middle of transceiver element 54 (for illustration purposes). Second signal path 90 includes a first path segment 92 from locus 84 to a reflection locus 86 situated on ground element 52, and a second path segment 94 from reflection locus 86 to outside transceiver element 54. First signal path 80 and second path segment 94 are substantially parallel and preferably colocated (they are separated in FIG. 13 to facilitate description). Thus, there may be interference between signals following first signal path 80 and second signal path 90 if first signal path 80 and second signal path 90 are of appropriately different lengths. First locus 82 and second locus 84 are situated on a circle 85 having a radius r centered on reflection locus 86. First locus 82 and second locus 84 are separated on circle 85 by a circumferential sector $\Delta C$. Thus, second signal path 90 is longer than first signal path 80 by an amount ($\Delta C+2r$). Depending upon whether the distance ($\Delta C+2r$) is an appropriate multiple of the wavelength of the signal emanating from loci 82, 84 on signal paths 80, 90, there may be interference between signals on signal paths 80, 90. Presence of a dielectric substrate supporting a copper transceiving element establishes a longer effective path for signals traversing transceiver element 54. That is, a dielectric substrate support structure establishes an effectively longer time delay that is manifested in an increase of the parameter $\Delta C$. Thus, a dielectric support substrate for transceiver element 54 may be employed to adjust phase relationships between direct signals (e.g., signals traveling via signal path 80) and reflected signals (e.g., signals traveling via signal path 90). The situation illustrated in FIG. 13 is representative of selected signal paths only. Other relationships among signal paths are also possible, as represented in FIGS. 14 and 15.

Figure 14:
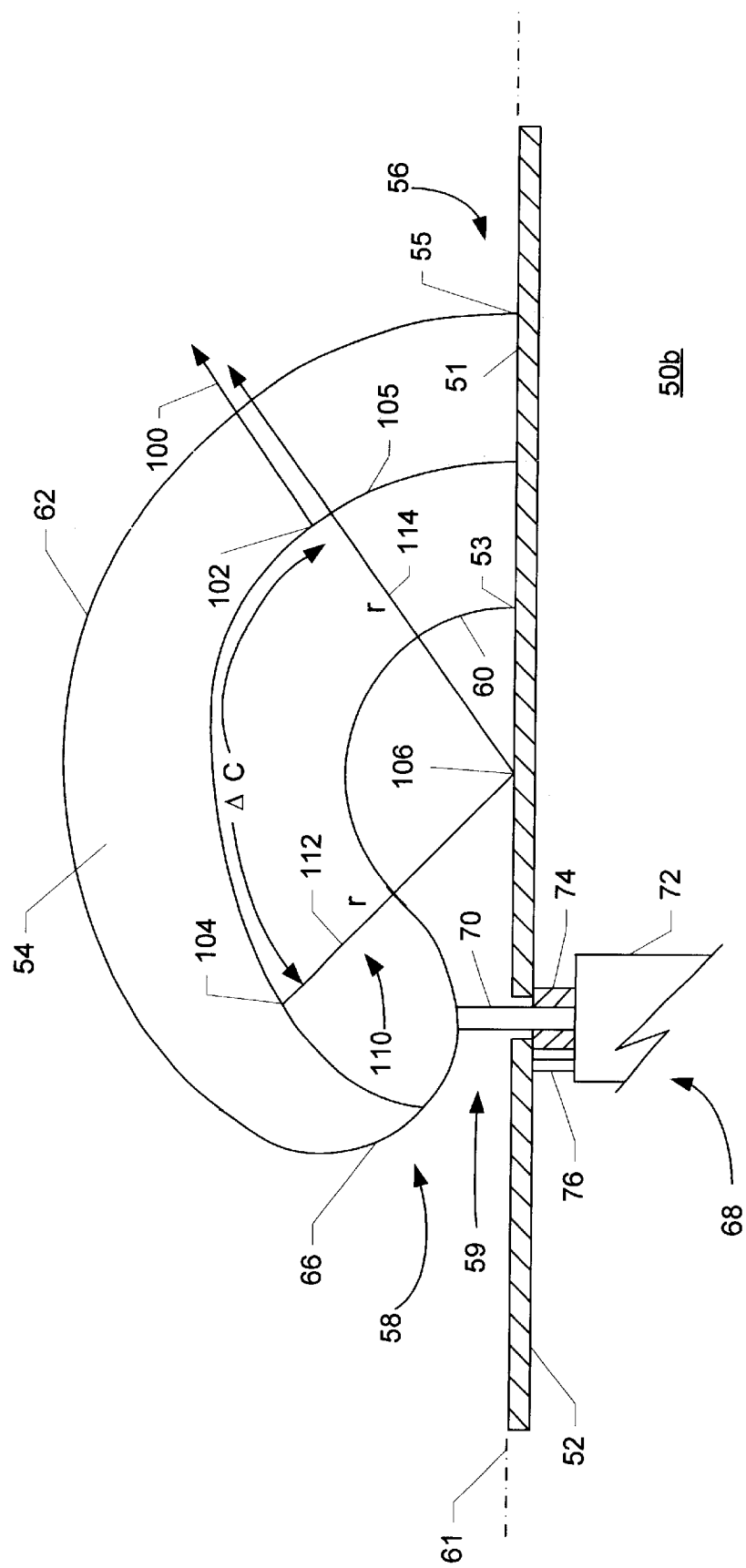
FIG. 14 is a plan view of the single element antenna illustrated in FIG. 12, illustrating a second representative set of signal transmission paths.
Figure 15:
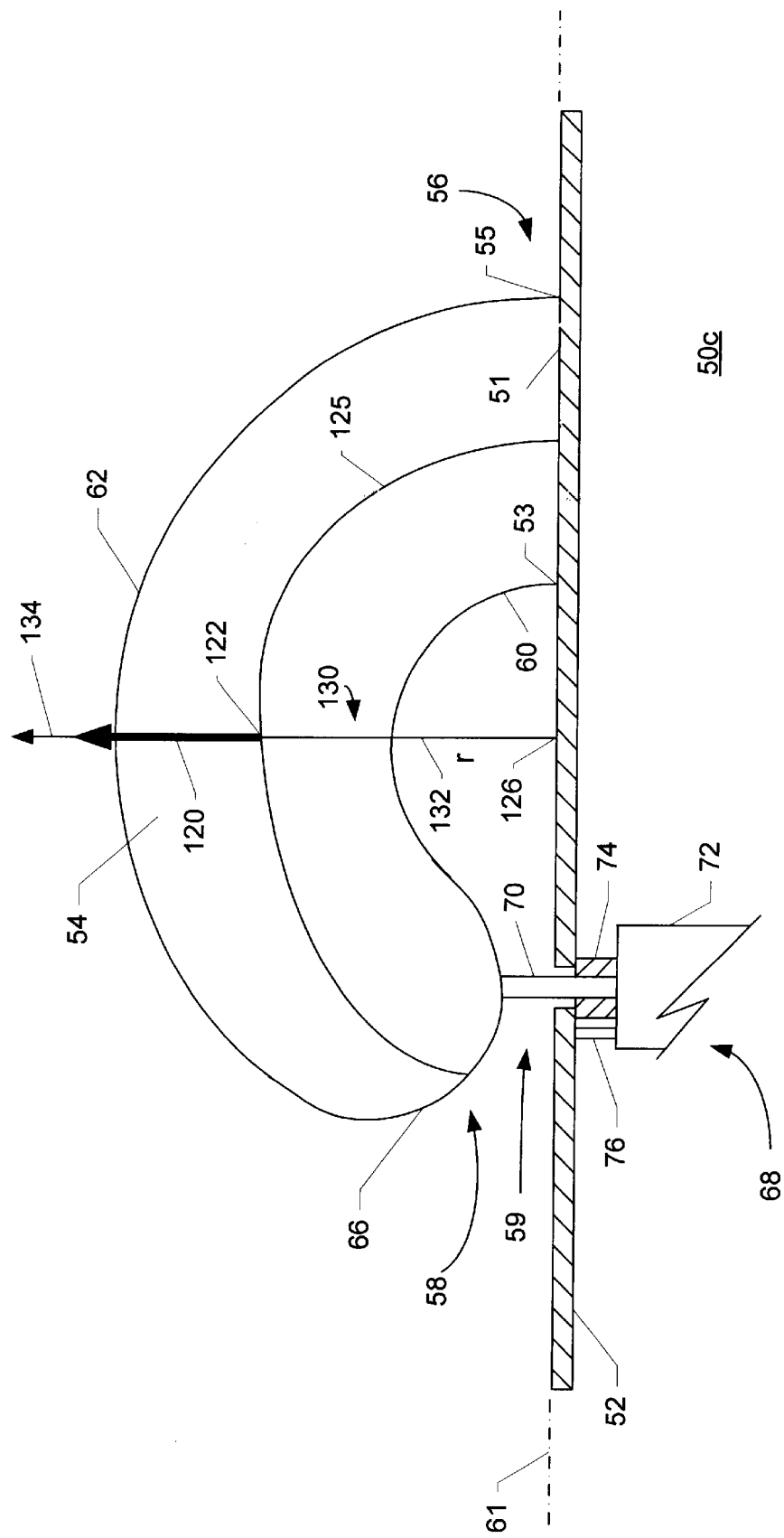
FIG. 15 is a plan view of the single element antenna illustrated in FIG. 12, illustrating a third representative set of signal transmission paths.

FIG. 14 is a plan view of the single element antenna illustrated in FIG. 12, illustrating a second representative set of signal transmission paths. In FIG. 14, an antenna apparatus 50b includes a ground element 52 and a transceiver element 54. Transceiver element 54 is affixed to ground element 52 at a first end 56 of transceiver element 54. Transceiver element 54 is spaced from ground element 52 at a second end 58 of transceiver element 54 to establish a gap 59 intermediate ground element 52 and transceiver element 54.

Transceiver element 54 is preferably substantially planar in a transceiver plane (not shown in FIG. 14) substantially containing transceiver element 54. Preferably, transceiver element 54 is configured as a layer of copper arranged upon a dielectric substrate to form generally planar transceiver element 54. Ground element 52 is preferably substantially planar in a ground plane 61 substantially containing ground element 52. Transceiver element 54 is bounded by a first edge 60 and a second edge 62 in the transceiver plane.

A first signal path 100 emanates from transceiver element 54 (for illustration purposes) from a locus 102 generally in the middle of transceiver element 54. A second signal path 110 emanates from a locus 104, also generally in the middle of transceiver element 54 (for illustration purposes). Second signal path 110 includes a first path segment 112 from locus 104 to a reflection locus 106 situated on ground element 52, and a second path segment 114 from reflection locus 106 to outside transceiver element 54. First signal path 100 and second path segment 114 are substantially parallel and preferably colocated (they are separated in FIG. 14 to facilitate description). Thus, there may be interference between signals following first signal path 100 and second signal path 110, if first signal path 100 and second signal path 110 are of appropriately different lengths. Locus 102 and locus 104 are situated on a circle 105 having a radius r centered on reflection locus 106. Locus 102 and locus 104 are separated on circle 105 by a circumferential sector $\Delta C$. Thus, second signal path 110 is differs in length from first signal path 100 by an amount ($2r-\Delta C$). Depending upon whether the distance ($2r-\Delta C$) is an appropriate multiple of the wavelength of the signal emanating from loci 102, 104 on signal paths 100, 110, there may be interference between signals on signal paths 100, 110. Presence of a dielectric substrate supporting a copper transceiving element establishes a longer effective path for signals traversing transceiver element 54. That is, a dielectric substrate support structure establishes an effectively longer time delay that is manifested in an increase of the parameter $\Delta C$. Thus, a dielectric support substrate for transceiver element 54 may be employed to adjust phase relationships between direct signals (e.g., signals traveling via signal path 100) and reflected signals (e.g., signals traveling via signal path 110). The situation illustrated in FIG. 14 is representative of selected signal paths only. Other relationships among signal paths are also possible, as represented in FIGS. 13 and 15.

FIG. 15 is a plan view of the single element antenna illustrated in FIG. 12, illustrating a third representative set of signal transmission paths. In FIG. 15, an antenna apparatus 50c includes a ground element 52 and a transceiver element 54. Transceiver element 54 is affixed to ground element 52 at a first end 56 of transceiver element 54. Transceiver element 54 is spaced from ground element 52 at a second end 58 of transceiver element 54 to establish a gap 59 intermediate ground element 52 and transceiver element 54.

Transceiver element 54 is preferably substantially planar in a transceiver plane (not shown in FIG. 15) substantially containing transceiver element 54. Preferably, transceiver element 54 is configured as a layer of copper arranged upon a dielectric substrate to form generally planar transceiver element 54. Ground element 52 is preferably substantially planar in a ground plane 61 substantially containing ground element 52. Transceiver element 54 is bounded by a first edge 60 and a second edge 62 in the transceiver plane.

A first signal path 120 emanates from transceiver element 54 (for illustration purposes) from a locus 122 generally in the middle of transceiver element 54. A second signal path 130 also emanates from locus 124. Second signal path 130 includes a first path segment 132 from locus 122 to a reflection locus 126 situated on ground element 52, and a second path segment from reflection locus 126 to outside transceiver element 54. First signal path 120 and second path segment 134 are substantially colinear. There may be interference between signals following first signal path 120 and second signal path 130, if first signal path 120 and second signal path 130 are of appropriately different lengths. Locus 122 is situated on a circle 125 having a radius r centered on reflection locus 126. Thus, second signal path 130 is longer than first signal path 120 by an amount (2r). Depending upon whether the distance (2r) is an appropriate multiple of the wavelength of the signal emanating from locus 122 on signal paths 120, 130, there may be interference between signals on signal paths 120, 130. Presence of a dielectric substrate supporting a copper transceiving element establishes a longer effective path for signals traversing transceiver element 54. That is, a dielectric substrate support structure establishes an effectively longer time delay that is manifested in an increase of the parameter ΔC. Thus, a dielectric support substrate for transceiver element 54 may be employed to adjust phase relationships between direct signals (e.g., signals traveling via signal path 120) and reflected signals (e.g., signals traveling via signal path 130). The situation illustrated in FIG. 15 is representative of selected signal paths only. Other relationships among signal paths are also possible, as represented in FIGS. 13 and 14.

Figure 16:
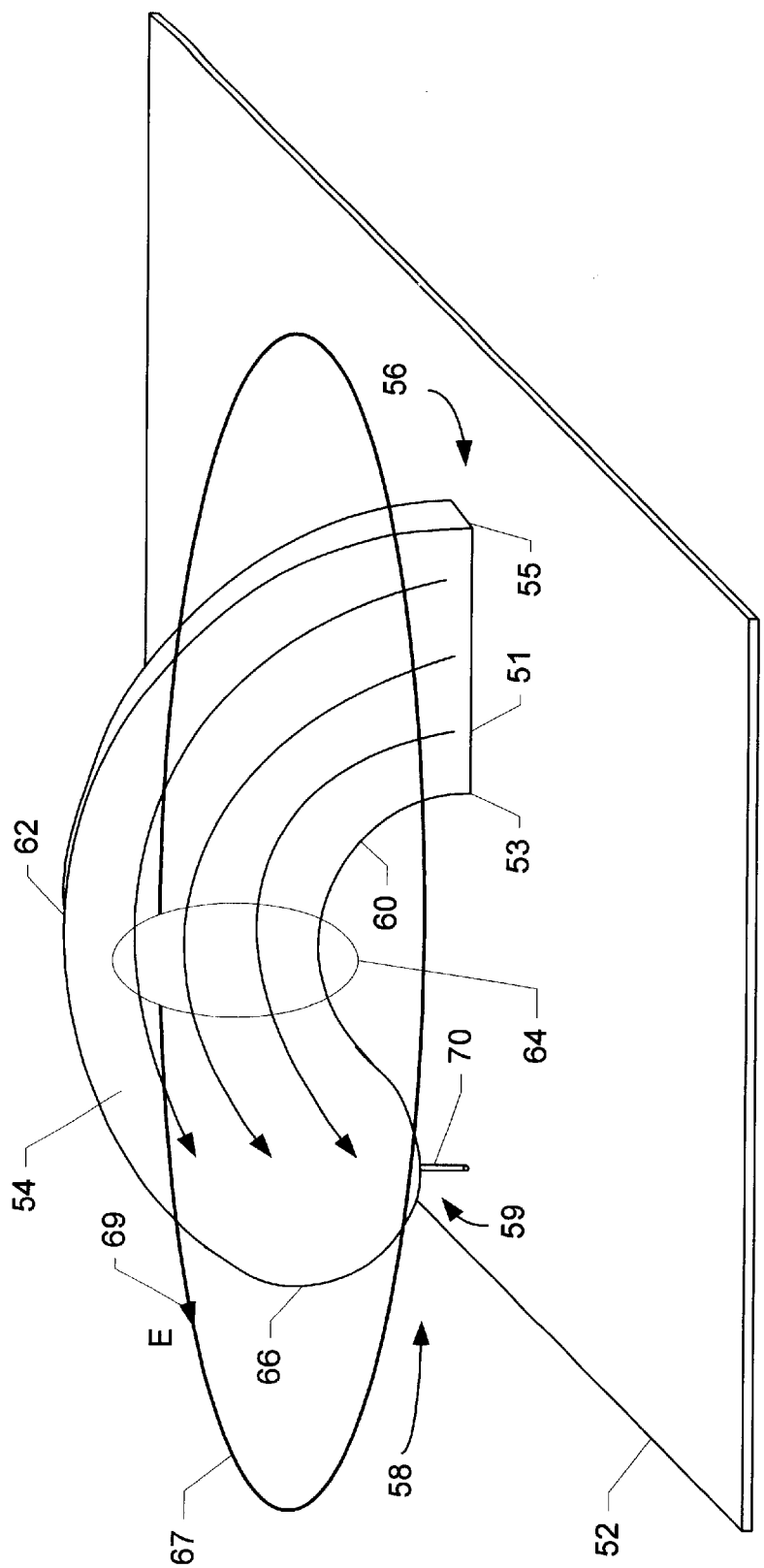
FIG. 16 is a perspective view of the single element antenna of the present invention with its associated electric radiation field.

FIG. 16 is a perspective view of the single element antenna of the present invention with its associated electric radiation field. In FIG. 16, an antenna apparatus 50 includes a ground element 52 and a transceiver element 54. Transceiver element 54 is preferably configured as a layer of copper 63 arranged upon a dielectric substrate 65 to form generally planar transceiver element 54. Transceiver element 54 is affixed to ground element 52 at a first end 56 of transceiver element 54. Transceiver element 54 is spaced from ground element 52 by a gap 59 at a second end 58 of transceiver element 54.

Transceiver element 54 intersects ground element in a joint 51 bounded by a first terminus 53 and a second terminus 55. Preferably, transceiver 54 and ground element 52 are perpendicular. Transceiver element 54 is bounded by a first edge 60 and a second edge 62 in the transceiver plane. First edge 60 departs in a departure direction from first terminus 53 at ground element 52, and second edge 62 departs in the same departure direction from second terminus 55 at ground element 52. There is thus defined a separation distance between first edge 60 and second edge 62. First edge 60 and second edge 62 terminate in a termination structure 66 at second end 58. Preferably, termination structure 66 is an arc-section that joins first edge 60 with second edge 62. Preferably, termination structure 66 has a diameter at least equal to the separation distance between first edge 60 and second edge 62 at second end 58. Termination structure 66 is coupled with a signal carrying conductor 70 that is part of a feed structure (not shown in FIG. 16).

As thus configured antenna apparatus 50 may provide signals via signal carrying conductor 70 to transceiver element 54 for transmission to a medium adjacent to transceiver element 54. During such a transmitting operation, current may alternately flow in transceiver element 54 in the directions indicated by arrows 64. Alternate current flow in the directions indicated by arrows 64 will support an electric radiation field 67 having a radiation field strength E in a vertical orientation vectorally directed as indicated by arrows 69. Such an orientation for electric radiation field 67 is advantageous when antenna 50 may be oriented to have a wide field of vision (i.e., a wide field orientation of electric radiation field 67) in a horizontal plane while exhibiting a relatively narrow field of vision in a vertical plane. Such an arrangement is particularly useful in certain applications, such as a position-determining ranging apparatus like a radar apparatus.

Figure 17:
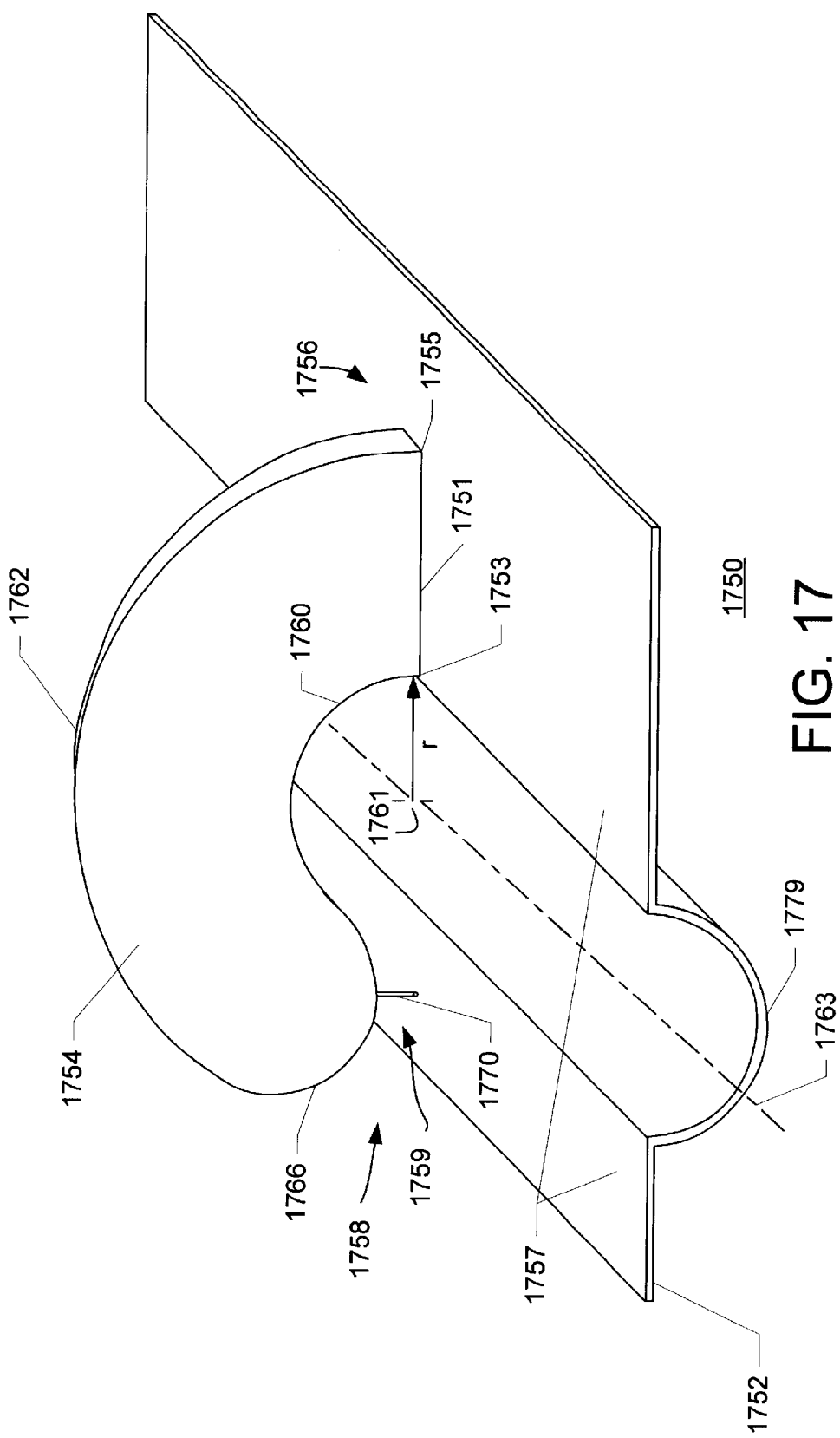
FIG. 17 is a perspective view of a first alternate embodiment of a single element antenna according to the present invention.

FIG. 17 is a perspective view of a first alternate embodiment of a single element antenna according to the present invention. In FIG. 17, an antenna apparatus 1750 includes a ground element 1752 and a transceiver element 1754. Transceiver element 1754 is affixed to ground element 1752 at a first end 1756 of transceiver element 1754. Transceiver element 1754 is spaced from ground element 1752 by a gap 1759 at a second end 1758 of transceiver element 1754. Transceiver element 1754 intersects ground element in a joint 1751 bounded by a first terminus 1753 and a second terminus 1755. Preferably, transceiver 1754 and ground element 1752 are perpendicular. Transceiver element 1754 is bounded by a first edge 1760 and a second edge 1762 in the transceiver plane. First edge 1760 departs in a departure direction from first terminus 1753 at ground plane 1752. First edge 1760 has a radius r with respect to a center point 1761. Second edge 1762 departs in the same departure direction from second terminus 1755 at ground plane 1752. There is thus defined a separation distance between first edge 1760 and second edge 1762. First edge 1760 and second edge 1762 terminate in a termination structure 1766 at second end 1758. Preferably, termination structure 1766 is an arc-section that joins first edge 1760 with second edge 1762. Preferably termination structure 1766 has a diameter at least equal to the separation distance between first edge 1760 and second edge 1762 at second end 1758. Termination structure 1766 is coupled with a signal carrying conductor 1770 that is part of a feed structure (not shown in FIG. 17).

Ground element 1752 includes a substantially planar land 1757 and a substantially semi-cylindrical channel structure 1779 that departs from planar land 1757 in a direction opposite from the departure direction of first edge 1760 and second edge 1762. Channel structure 1779 has a longitudinal axis 1763; longitudinal axis 1763 passes through center point 1761. Channel structure 1779 has a radius that is substantially equal to radius r of first edge 1760. Thus, channel structure 1779 and first edge 1760 are substantially symmetrically arranged about center point 1761 in a plane containing transceiver element 1754. In such a symmetric arrangement, certain transmit and receive characteristics of antenna apparatus 1750 may be enhanced for certain frequencies.

Figure 18:
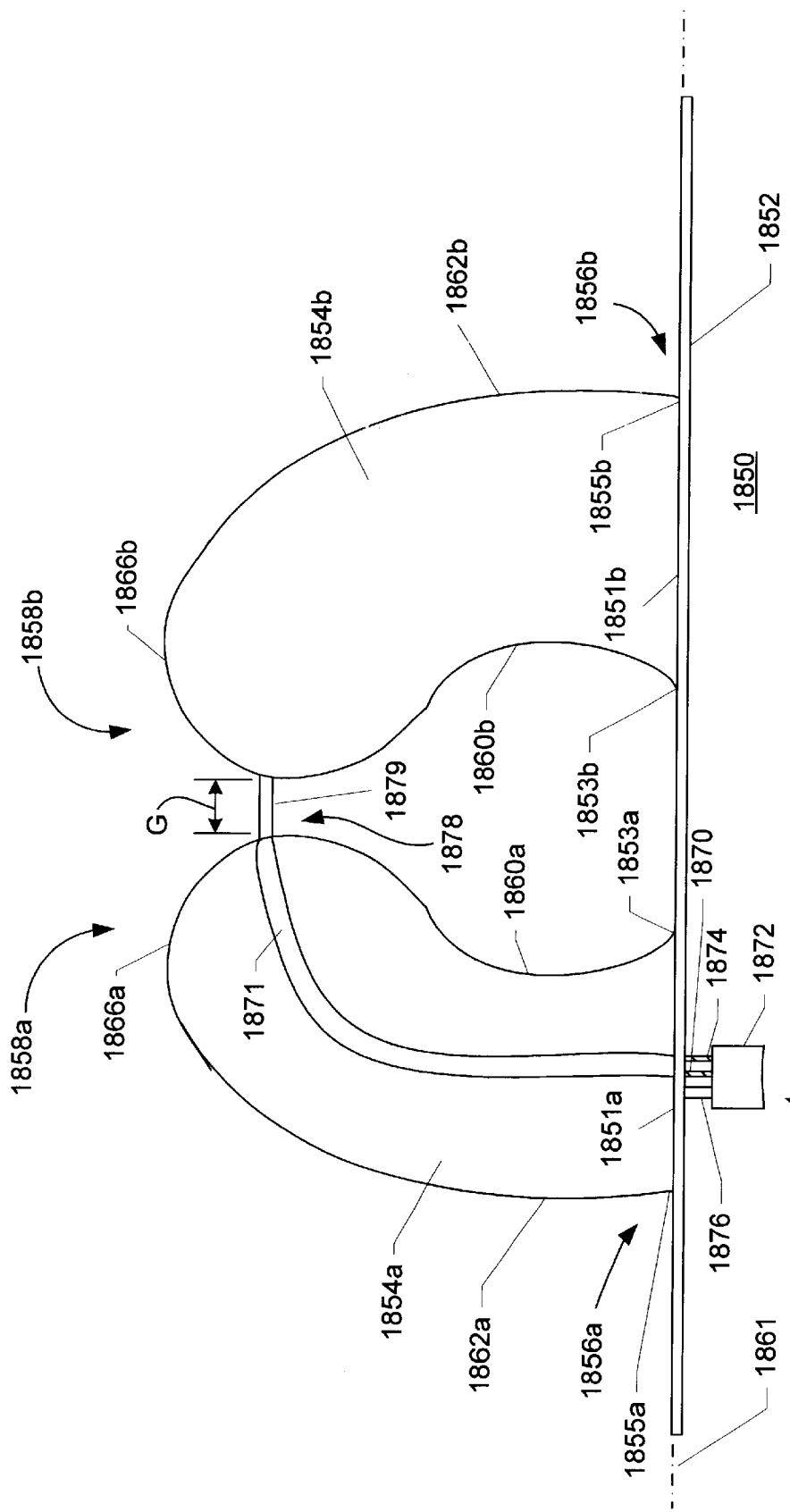
FIG. 18 is a side view of a second alternate embodiment of a single element antenna according to the present invention.

FIG. 18 is a side view of a second alternate embodiment of a single element antenna according to the present invention. In FIG. 18, an antenna apparatus 1850 includes a ground element 1852, a first transceiver element 1854a and a second transceiver element 1854b. First transceiver element 1854a is affixed to ground element 1852 at a first end 1856a of first transceiver element 1854a. Second transceiver element 1854b is affixed to ground element 1852 at a first end 1856b of second transceiver element 1852b. A gap 1878 having a gap dimension G is established by a spaced relation between a second end 1858a of first transceiver element 1854a and a second end 1858b of second transceiver element 1854b.

Transceiver elements 1854a, 1854b are preferably substantially coplanar in a transceiver plane (not shown in FIG. 18) substantially containing transceiver elements 1854a, 1854b. Ground element 1852 is preferably substantially planar in a ground plane 1861 substantially containing ground element 1852.

First transceiver element 1854a intersects ground element 1852 in a joint 1851a bounded by a first terminus 1853a and a second terminus 1855a. Preferably, first transceiver element 1854a and ground element 1852 are perpendicular. First transceiver element 1854a is bounded by a first edge 1860a and a second edge 1862a in the transceiver plane. First edge 1860a departs in a departure direction from first terminus 1853a at ground element 1852; second edge 1862a departs in the same departure direction from second terminus 1855a at ground element 1852. There is a separation distance between first edge 1860a and second edge 1862a. First edge 1860a and second edge 1862a terminate in a termination structure 1866a at second end 1858a. Preferably, termination structure 1866a is an arc-section that joins first edge 1860a with second edge 1862a. Preferably, termination structure 1866a has a diameter at least equal to the separation distance at second end 1858a.

Second transceiver element 1854b intersects ground element 1852 in a joint 1851b bounded by a first terminus 1853b and a second terminus 1855b. Preferably, second transceiver element 1854b and ground element 1852 are perpendicular. Second transceiver element 1854b is bounded by a first edge 1860b and a second edge 1862b in the transceiver plane. First edge 1860b departs in a departure direction from first terminus 1853b at ground element 1852; second edge 1862b departs in the same departure direction from second terminus 1855b at ground element 1852. There is a separation distance between first edge 1860b and second edge 1862b. First edge 1860b and second edge 1862b terminate in a termination structure 1866b at second end 1858b. Preferably, termination structure 1866b is an arc-section that joins first edge 1860b with second edge 1862b. Preferably, termination structure 1866b has a diameter at least equal to the separation distance at second end 1858b.

First termination structure 1866a is coupled with a feed lead 1871. Feed lead 1871 connects with a feed structure 1868. Feed lead 1871 may be embodied in such configurations as, by way of illustration and not by way of limitation, coaxial cable, stripline, microstrip, twin lead, twisted pair fiber optic cable, wave guide or other transmission line, or any connector or coupler that enables connection to a transmission line. A feed bridge 1879 connects termination structure 1866b with feed structure 1868 via feed lead 1871. Preferably, feed structure 1868 is a coaxial feed arrangement for conveying signals to and from first transceiver element 1854a. Feed structure 1868 may be embodied in other configurations such as, by way of illustration and not by way of limitation, coaxial cable, stripline, microstrip, twin lead, twisted pair fiber optic cable, wave guide or other transmission line, or any connector or coupler that enables connection to a transmission line.

Feed structure 1868 preferably includes a signal carrying conductor 1870 surrounded by a shield 1872 with an insulator 1874 intermediate conductor 1870 and shield 1872. A ground connection 1876 is established intermediate shield 1872 and ground element 1852 when feed structure 1868 is installed.

Figure 19:
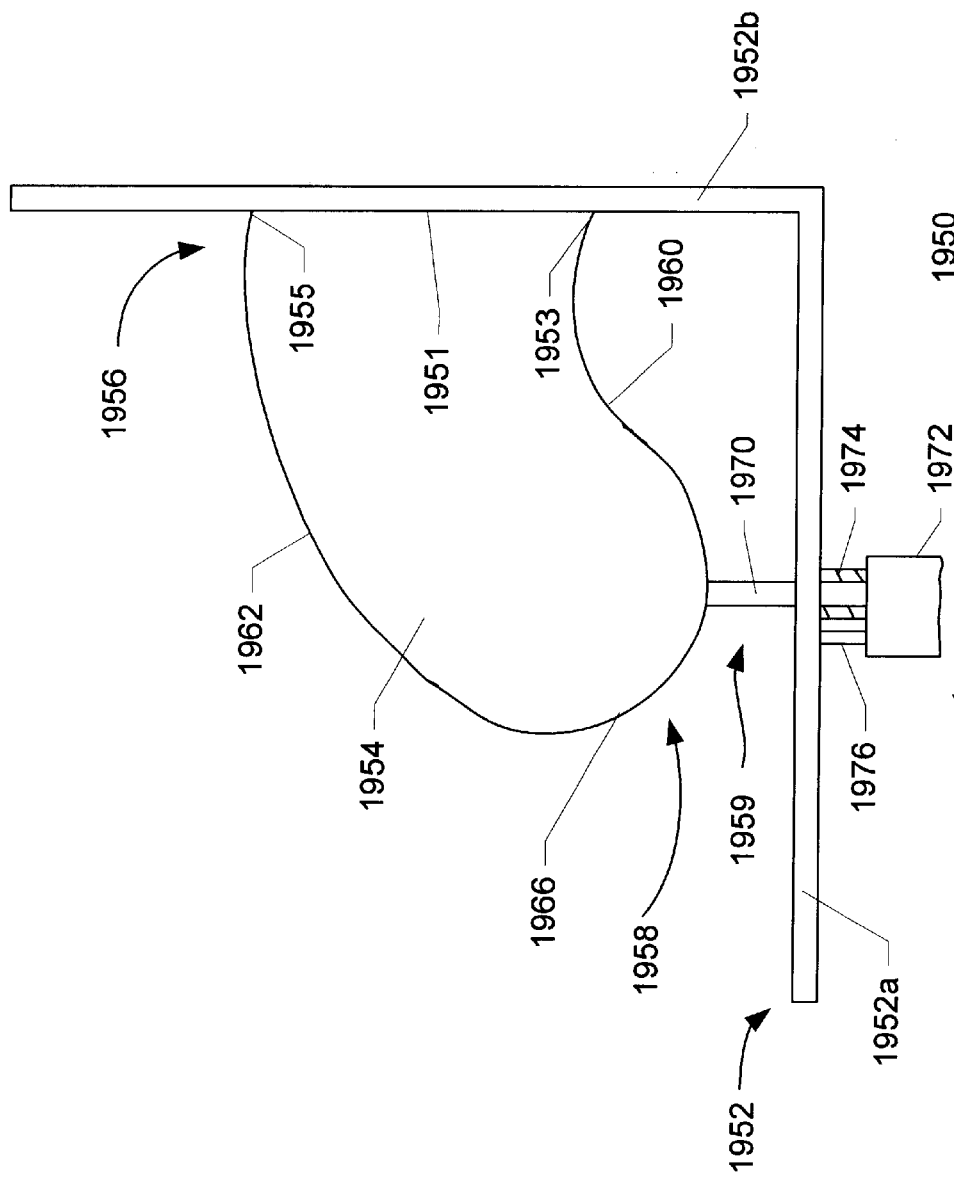
FIG. 19 is a side view of a third alternate embodiment of a single element antenna according to the present invention.

FIG. 19 is a side view of a third alternate embodiment of a single element antenna according to the present invention. In FIG. 19, an antenna apparatus 1950 includes a ground element 1952 and a transceiver element 1954. Ground element 1952 includes a first ground element segment 1952a and a second ground element segment 1952b. Preferably ground element segments 1952a, 1952b are perpendicular (they may meet at another angle than 90 degrees) and form what is commonly known as a corner reflector. Transceiver element 1954 is affixed to second ground element segment 1952b at a first end 1956 of transceiver element 1954. Transceiver element 1954 is spaced from first ground element segment 1952a by a gap 1959 at a second end 1958 of transceiver element 1954.

Transceiver element 1954 is preferably substantially planar in a transceiver plane (not shown in FIG. 19) substantially containing transceiver element 1954. Each respective ground element segment 1952a, 1952b is preferably substantially planar. Transceiver element 1954 intersects second ground element segment 1952b in a joint 1951 bounded by a first terminus 1953 and a second terminus 1955. Preferably, transceiver element 1954 and second ground element segment 1952b are perpendicular. Transceiver element 1954 is bounded by a first edge 1960 and a second edge 1962 in the transceiver plane. First edge 1960 departs in a departure direction from first terminus 1953 at second ground element segment 1952b. Second edge 1962 departs in the same departure direction from second terminus 1955 at second ground element segment 1952b. There is a separation distance between first edge 1960 and second edge 1962. First edge 1960 and second edge 1962 terminate in a termination structure 1966 at second end 1958. Preferably, termination structure 1966 is an arc-section that joins first edge 1960 with second edge 1962. Preferably termination structure 1966 has a diameter at least equal the separation distance at second end 1958.

Termination structure 1966 is coupled with a feed structure 1968. Preferably, feed structure 1968 is a coaxial feed arrangement for conveying signals to and from transceiver element 1954. Feed structure 1968 may be embodied in other configurations such as, by way of illustration and not by way of limitation, coaxial cable, stripline, microstrip, twin lead, twisted pair fiber optic cable, wave guide or other transmission line, or any connector or coupler that enables connection to a transmission line. Feed structure 1968 preferably includes a signal carrying conductor 1970 surrounded by a shield 1972 with an insulator 1974 intermediate conductor 1970 and shield 1972. A ground connection 1976 is established intermediate shield 1972 and ground element segment 1952a when feed structure 1968 is installed.

Figure 20:
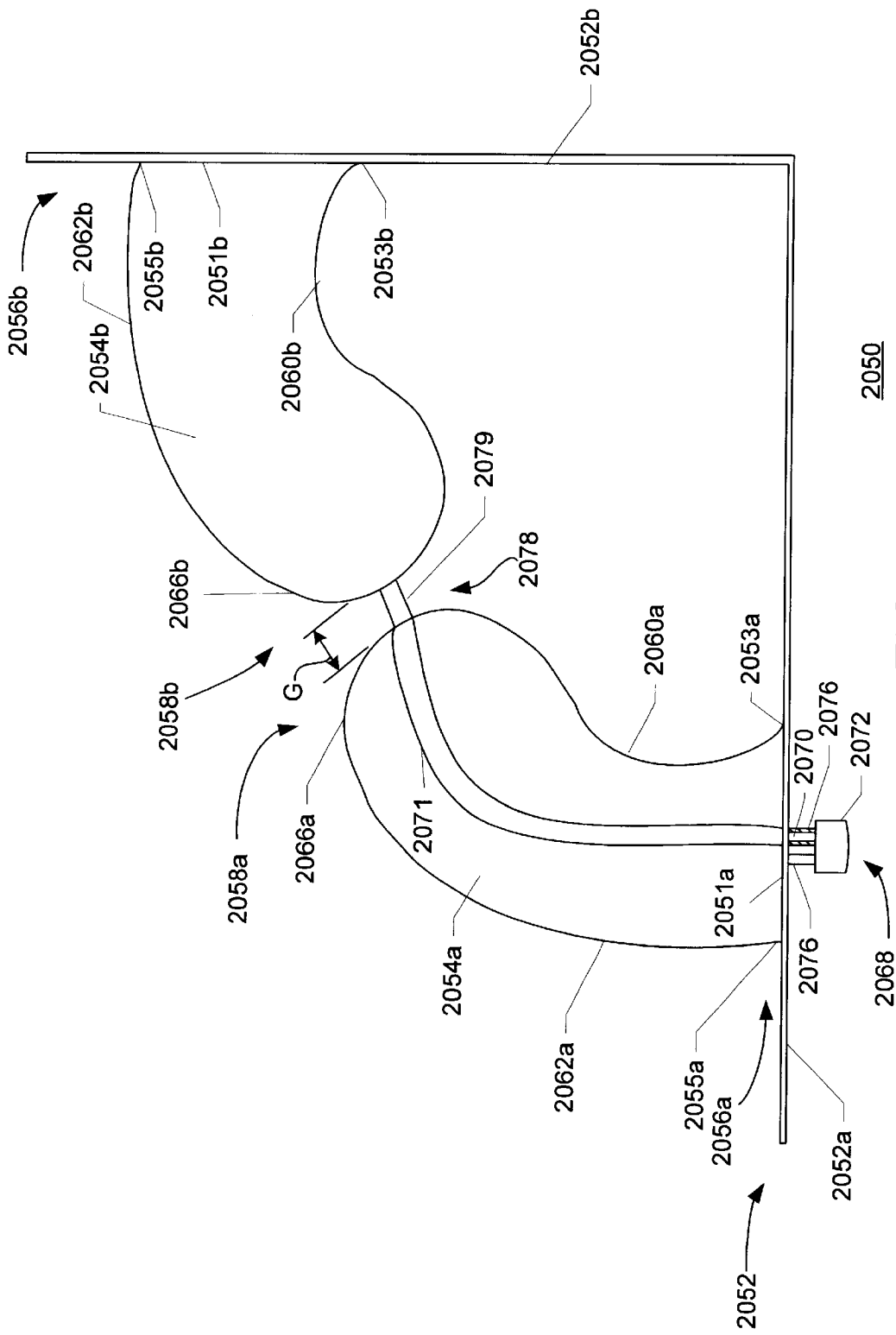
FIG. 20 is a side view of a fourth alternate embodiment of a single element antenna according to the present invention.

FIG. 20 is a side view of a fourth alternate embodiment of a single element antenna according to the present invention. In FIG. 20, an antenna apparatus 2050 includes a ground element 2052, a first transceiver element 2054a and a second transceiver element 2054b. Ground element 2052 includes a first ground element segment 2052a and a second ground element segment 2052b. Preferably ground element segments 2052a, 2052b are perpendicular (they may meet at another angle than 90 degrees) and form what is commonly known as a corner reflector. First transceiver element 2054a is affixed to first ground element segment 2052a at a first end 2056a of first transceiver element 2052a. Second transceiver element 2054b is affixed to second ground element segment 2052b at a first end 2056b of second transceiver element 2054b. A gap 2078 having a gap dimension G is established by a spaced relation between a second end 2058a of first transceiver element 2054a and a second end 2058b of second transceiver element 2054b.

Transceiver elements 2054a, 2054b are preferably substantially coplanar in a transceiver plane (not shown in FIG. 20) substantially containing transceiver elements 2054a, 2054b. Each respective ground element segment 2052a, 2052b is preferably substantially planar.

First transceiver element 2054a intersects first ground element segment 2052a in a joint 2051a bounded by a first terminus 2053a and a second terminus 2055a. Preferably, first transceiver element 2054a and first ground element segment 2052a are perpendicular. First transceiver element 2054a is bounded by a first edge 2060a and a second edge 2062a in the transceiver plane. First edge 2060a departs in a departure direction from first terminus 2053a at first ground element segment 2052a; second edge 2062a departs in the same departure direction from second terminus 2055a at first ground element segment 2052a. There is a separation distance between first edge 2060a and second edge 2062a. First edge 2060a and second edge 2062a terminate in a termination structure 2066a at second end 2058a. Preferably, termination structure 2066a is an arc-section that joins first edge 2060a with second edge 2062a. Preferably, termination structure 2066a has a diameter at least equal to the separation distance at second end 2058a.

Second transceiver element 2054b intersects second ground element segment 2052b in a joint 2051b bounded by a first terminus 2053b and a second terminus 2055b. Preferably, second transceiver element 2054b and second ground element segment 2052b are perpendicular. Second transceiver element 2054b is bounded by a first edge 2060b and a second edge 2062b in the transceiver plane. First edge 2060b departs in a departure direction from first terminus 2053b at second ground element segment 2052b; second edge 2062b departs in the same departure direction from second terminus 2055b at second ground element segment 2052b. There is a separation distance between first edge 2060b and second edge 2062b. First edge 2060b and second edge 2062b terminate in a termination structure 2066b at second end 2058b. Preferably, termination structure 2066b is an arc-section distance that joins first edge 2060b with second edge 2062b. Preferably, termination structure 2066b has a diameter at least equal to the separation distance at second end 2058b.

Termination structure 2066a is coupled with a feed lead 2071. A feed bridge 2079 connects termination structure 2066b with feed structure 2068 via feed lead 2071. Feed lead 2071 connects with a feed structure 2068. Preferably, feed structure 2068 is a coaxial feed arrangement for conveying signals to and from transceiver element 2054a. Feed structure 2068 may be embodied in other configurations such as, by way of illustration and not by way of limitation, coaxial cable, stripline, microstrip, twin lead, twisted pair fiber optic cable, wave guide or other transmission line, or any connector or coupler that enables connection to a transmission line. Feed structure 2068 preferably includes a signal carrying conductor 2070 surrounded by a shield 2072 with an insulator 2074 intermediate conductor 2070 and shield 2072. A ground connection 2076 is established intermediate shield 2072 and ground element 2052 when feed structure 2068 is installed.

Figure 21:
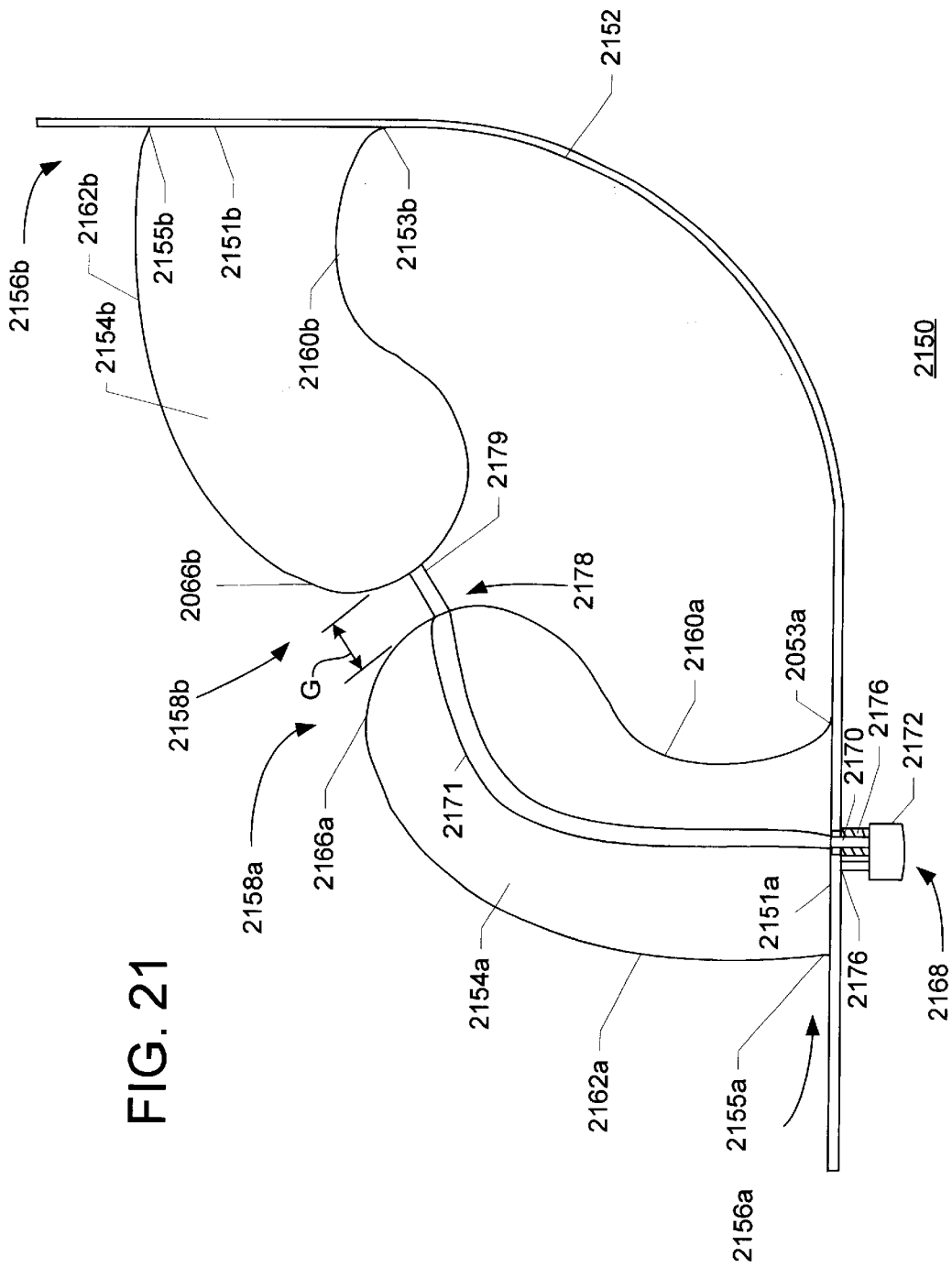
FIG. 21 is a side view of a fifth alternate embodiment of a single element antenna according to the present invention.

FIG. 21 is a side view of a fifth alternate embodiment of a single element antenna according to the present invention. In FIG. 21, an antenna apparatus 2150 includes a ground element 2152, a first transceiver element 2154a and a second transceiver element 2154b. Ground element 2152 is a curved shape, preferably spherical or parabolic in at least two dimensions, but other curved configurations may be employed as well to form what is commonly known as a directional reflector. First transceiver element 2154a is affixed to ground element 2152 at a first end 2156a of first transceiver element 2152a. Second transceiver element 2154b is affixed to ground element 2152 at a first end 2156b of second transceiver element 2154b. A gap 2178 having a gap dimension G is established by a spaced relation between a second end 2158a of first transceiver element 2154a and a second end 21584b of second transceiver element 2154b.

Transceiver elements 2154a, 2154b are preferably substantially coplanar in a transceiver plane (not shown in FIG. 21) substantially containing transceiver elements 2154a, 2154b. First transceiver element 2154a intersects ground element 2152 in a joint 2151a bounded by a first terminus 2153a and a second terminus 2155a. First transceiver element 2154a is bounded by a first edge 2160a and a second edge 2162a in the transceiver plane. First edge 2160a departs in a departure direction from first terminus 2153a at ground element 2152; second edge 2162a departs in the same departure direction from second terminus 2155a at ground element 2152. There is a separation distance between first edge 2160a and second edge 2162a. First edge 2160a and second edge 2162a terminate in a termination structure 2166a at second end 2158a. Preferably, termination structure 2166a is an arc-section that joins first edge 2160a with second edge 2162a. Preferably, termination structure 2166a has a diameter at least equal to the separation distance at second end 2158a.

Second transceiver element 2154b intersects ground element 2152 in a joint 2151b bounded by a first terminus 2153b and a second terminus 2155b. Second transceiver element 2154b is bounded by a first edge 2160b and a second edge 2162b in the transceiver plane. First edge 2160b departs in a departure direction from first terminus 2153b at ground element 2152; second edge 2162b departs in the same departure direction from second terminus 2155b at ground element 2152. There is a separation distance between first edge 2160b and second edge 2162b. First edge 2160b and second edge 2162b terminate in a termination structure 2166b at second end 2158b. Preferably, termination structure 2166b is an arc-section distance that joins first edge 2160b with second edge 2162b. Preferably, termination structure 2166b has a diameter at least equal to the separation distance at second end 2158b.

Termination structure 2166a is coupled with a feed lead 2171. A feed bridge 2179 connects termination structure 2166b with feed structure 2168 via feed lead 2171. Feed lead 2171 connects with a feed structure 2168. Preferably, feed structure 2168 is a coaxial feed arrangement for conveying signals to and from transceiver element 2154a. Feed structure 2168 may be embodied in other configurations such as, by way of illustration and not by way of limitation, coaxial cable, stripline, microstrip, twin lead, twisted pair fiber optic cable, wave guide or other transmission line, or any connector or coupler that enables connection to a transmission line. Feed structure 2168 preferably includes a signal carrying conductor 2170 surrounded by a shield 2172 with an insulator 2174 intermediate conductor 2170 and shield 2172. A ground connection 2176 is established intermediate shield 2172 and ground element 2152 when feed structure 2168 is installed.

An important general observation is appropriate here: prior art loop antennas have been designed seeking to eliminate reflections from associated ground plane structures. The design of the present invention, in all of its various embodiments, seeks to employ associated reflector structures and their reflected signals to advantage to reinforce signal propagation in order to enhance performance.

Keeping in mind the characteristics that are preferably optimized for an antenna employed with an impulse radio system (i.e., the antenna should be a broadband antenna that is small and compact, well-matched—preferably impedance-matched with a 50 ohm load, efficient without a propensity for ringing when subjected to pulsed signals, non-dispersive in its transceiving operations, and radiates in a broad beam) one must consider the ease of manufacture in reliable quantities provided by a planar antenna.

Because the antennas disclosed in the present invention are capable of radiating very short, non-time-dispersive pulses, they are ideal for use in an array. Conventional elements in arrays exhibit undesirable grating lobes as later lobes of a pulse waveform interfere with earlier lobes. The antennas that are the subject of the present disclosure can emit short non-time-dispersive pulses that significantly mitigate the grating lobe problem.

Such short pulse waveforms allow the antennas of the present invention to be advantageously used in conjunction with comer, planar, convex cylindrical or concave cylindrical reflectors. When conventional antennas are used in a reflector, defocusing leads to undesired grating lobes. The short, non-time-dispersive pulses of the antennas of the present invention allow a reflected waveform to be defocused without leading to the grating lobes experienced when using conventional antennas. Defocusing a waveform without creating grating lobes permits higher gain and directivity than are achievable using prior art antenna elements.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for transferring electromagnetic energy intermediate a host device and a medium substantially adjacent to the apparatus;

the apparatus comprising:
   (a) at least one ground element;
      at least a portion of said at least one ground element being generally coplanar with a ground plane;
   (b) at least one radiating element;
      said at least one radiating element being electrically coupled with said at least one ground element at said ground plane at a first end and being in spaced relation from said ground plane at a second end;
      said at least one radiating element cooperating with said at least one ground element in effecting said transferring;
      said at least one radiating element being substantially coplanar with a radiator plane;
      said radiator plane being substantially perpendicular with said ground plane; and
   (c) a feed structure;
      said feed structure conveying said electromagnetic energy intermediate said host device and said radiating element;
      said at least one radiating element being bounded in said radiator plane generally by a first sector of a first circle having a first radius and a second sector of a second circle having a second radius;
         said first radius and said second radius differing by a radial difference;
         said first circle and said second circle being generally concentrically situated;
         said first sector and said second sector being joined at said second end in a terminal structure.

2. An apparatus for transferring electromagnetic energy intermediate a host device and a medium substantially adjacent to the apparatus as recited in claim 1 wherein said terminal structure is a generally circular arc-section having a diameter at least equal to said radial difference.

3. An apparatus for transferring electromagnetic energy intermediate a host device and a medium substantially adjacent to the apparatus as recited in claim 1 wherein said feed structure effects a ground connection with said at lest one ground element and connects a signal bearing conductor with said radiating element.

4. An apparatus for transferring electromagnetic energy intermediate a host device and a medium substantially adjacent to the apparatus as recited in claim 2 wherein said feed structure effects a ground connection with said at least one ground element and connects a signal bearing conductor with said radiating element.

5. An antenna for transferring electromagnetic energy intermediate a host device and a medium adjacent the antenna;

the antenna comprising:
   (a) a ground element;
      at least a portion of said ground element being generally coplanar with a ground plane;
   (b) a substantially planar transceiver element substantially coplanar with a transceiver plane;
      said transceiver element intersecting said ground element at a first end in a joint;
      said joint having a first terminus and a second terminus defining a joint length;
      a first edge of said transceiver element departing from said first terminus in a first arcuate path in a first direction from said ground plane;
      a second edge of said transceiver element departing from said second terminus in a second arcuate path generally in said first direction;
      said first edge and said second edge each including at least one arc-set;
      each respective arc-set of said at least one arc-set including a first arc having a first radius describing a respective first edge sector of said first edge and a second arc having a second radius describing a respective second edge sector of said second edge;
      said first edge sector and said second edge sector of each said respective arc-set being generally concentric;
      said first radius and said second radius defining a radial separation between said first edge sector and said second edge sector;
      said first edge and said second edge terminating in a terminal structure at a second end distal from said first end;
      said terminal structure being in spaced relation with respect to said ground element to establish a gap intermediate said transceiver element and said ground element; and
   (c) a feed structure;
      said feed structure conveying said electromagnetic energy intermediate said transceiver element and said host device.

6. An antenna for transferring electromagnetic energy intermediate a host device and a medium adjacent the antenna as recited in claim 5 wherein said terminal structure is a generally circular arc-section intersecting said first edge and said second edge;
   said arc-section having a diameter at least equal to said radial separation intermediate said first edge and said second edge at said second end.

7. An antenna for transferring electromagnetic energy intermediate a host device and a medium adjacent the antenna as recited in claim 5 wherein said feed structure effects a ground connection with said ground element and connects a signal bearing conductor with said transceiver element.

8. An antenna for transferring electromagnetic energy intermediate a host device and a medium adjacent the antenna as recited in claim 6 wherein said feed structure effects a ground connection with said ground element and connects a signal bearing conductor with said transceiver element.

9. An antenna for transferring electromagnetic energy intermediate a host device and a medium adjacent to the antenna;

the antenna comprising:
  (a) a ground element;
    at least a portion of said ground element being generally coplanar with a ground plane;
  (b) a substantially planar transceiver element generally coplanar with a transceiver plane;
    said transceiver element intersecting said ground element at a first end in a joint;
    said joint having a first terminus and a second terminus defining a joint length;
    a first edge of said transceiver element departing from said first terminus in a first arcuate path in a first direction from said ground plane;
    a second edge of said transceiver element departing from said second terminus in a second arcuate path generally in said first direction;
    said first edge and said second edge each including at least one arc-set;
    each respective arc-set of said at least one arc-set including a first arc having a first radius describing a respective first edge sector of said first edge and a second arc having a second radius describing a respective second edge sector of said second edge;
    said first radius and said second radius defining a transverse separation between said first edge sector and said second edge sector;
    said first edge and said second edge terminating in a terminal structure at a second end distal from said first end;
    said terminal structure being in spaced relation with respect to said ground element to establish a gap intermediate said transceiver element and said ground element; and
  (c) a feed structure;
    said feed structure conveying said electromagnetic energy intermediate said transceiver element and said host device.

10. An antenna for transferring electromagnetic energy intermediate a host device and a medium adjacent the antenna as recited in claim 9 wherein said terminal structure is a generally circular arc-section intersecting said first edge and said second edge;
  said arc-section having a diameter at least equal to said transverse separation intermediate said first edge and said second edge at said second end.

11. An antenna for transferring electromagnetic energy intermediate a host device and a medium adjacent the antenna as recited in claim 9 wherein said feed structure effects a ground connection with said ground element and connects a signal bearing conductor with said transceiver element.

12. An antenna for transferring electromagnetic energy intermediate a host device and a medium adjacent the antenna as recited in claim 10 wherein said feed structure effects a ground connection with said ground element and connects a signal bearing conductor with said transceiver element.

13. An antenna for effecting transfer of electromagnetic signals intermediate a host device and a medium adjacent the antenna;

said electromagnetic signals having a range of frequencies intermediate a high-limit frequency and a low-limit frequency;

the antenna comprising:
  (a) a ground element;
    at least a portion of said ground element being generally coplanar with a ground plane;
  (b) a substantially planar transceiver element substantially coplanar with a transceiver plane;
    said transceiver element intersecting said ground element at a first end in a joint;
    said joint having a first terminus and a second terminus defining a joint length;
    a first edge of said transceiver element departing from said first terminus in a first arcuate path in a first direction from said ground element;
    a second edge of said transceiver element departing from said second terminus in a second arcuate path generally in said first direction;
    said first arcuate path extending a first path length and terminating at a second end of said transceiver element distal from said first end;
    said second arcuate path extending a second path length and terminating at said second end;
    said first path length being related to a first wavelength of one frequency of said high-limit frequency and said low-limit frequency;
    said second path length being related to a second wavelength of the other frequency of said high-limit frequency and said low-limit frequency than said one frequency;
    said first edge and said second edge terminating in a terminal structure at said second end;
    said first edge and said second edge being separated by a transverse distance at said second end; and
  (c) a feed structure;
    said feed structure conveying said electromagnetic signal intermediate said transceiver element and said host device.

14. An antenna for effecting transfer of electromagnetic signals intermediate a host device and a medium adjacent to the antenna as recited in claim 13 wherein said transceiver plane is substantially perpendicular with said ground plane.

15. An antenna for effecting transfer of electromagnetic signals intermediate a host device and a medium adjacent to the antenna as recited in claim 13 wherein said terminal structure is a generally circular arc-section having a diameter at least equal to said transverse distance.

16. An antenna for effecting transfer of electromagnetic signals intermediate a host device and a medium adjacent to the antenna as recited in claim 14 wherein said terminal structure is a generally circular arc-section having a diameter at least equal to said transverse distance.

17. An antenna for effecting transfer of electromagnetic signals intermediate a host device and a medium adjacent to the antenna as recited in claim 13 wherein said feed structure effects a ground connection with said ground element and connects a signal bearing conductor with said radiating element.

18. An antenna for effecting transfer of electromagnetic signals intermediate a host device and a medium adjacent to the antenna as recited in claim 14 wherein said feed structure effects a ground connection with said ground element and connects a signal bearing conductor with said radiating element.

19. An antenna for effecting transfer of electromagnetic signals intermediate a host device and a medium adjacent to the antenna as recited in claim 15 wherein said feed structure effects a ground connection with said ground element and connects a signal bearing conductor with said radiating element.

20. An antenna for effecting transfer of electromagnetic signals intermediate a host device and a medium adjacent to the antenna as recited in claim 16 wherein said feed structure effects a ground connection with said ground element and connects a signal bearing conductor with said radiating element.

21. An antenna for effecting transfer of electromagnetic signals intermediate a host device and a medium adjacent to the antenna;
  said electromagnetic signals having a range of frequencies intermediate a high-limit frequency and a low-limit frequency;
  the antenna comprising:
  (a) at least one ground element;
    at least a portion of said at least one ground element being generally coplanar with at least one ground plane;
  (b) at least one substantially planar transceiver element;
    at least a portion of said at least one transceiver element being generally coplanar with at least one transceiver plane;
    a selected said transceiver element of said at least one transceiver element intersecting a selected ground element of said at least one ground element at a respective first end in a respective joint;
    said respective joint having a respective first terminus and a respective second terminus defining a respective joint length;
    a respective first edge of said selected transceiver element departing from said respective first terminus in a respective first arcuate path in a respective first direction from said selected ground element;
    a respective second edge of said selected transceiver element departing from said respective second terminus in a respective second arcuate path generally in said respective first direction;
    said respective first arcuate path extending a respective first path length and terminating at a respective second end of said selected transceiver element distal from said respective first end;
    said respective second arcuate path extending a respective second path length and terminating at said respective second end;
    said respective first arcuate path and said respective second arcuate path being non-intersecting paths along said respective first path length and said respective second path length;
    said respective first path length being related to a first wavelength of one frequency of said high-limit frequency and said low-limit frequency;
    said respective second path length being related to a second wavelength of the other frequency of said high-limit frequency and said low-limit frequency than said one frequency;
    said respective first edge and said respective second edge terminating in a respective terminal structure at said respective second end;
    said respective first edge and said respective second edge being separated by a respective transverse distance at said respective second end; and
  (c) a feed structure;
    said feed structure conveying said electromagnetic signal intermediate said respective transceiver element and said host device.

22. An antenna for effecting transfer of electromagnetic signals intermediate a host device and a medium adjacent to the antenna;
  the antenna comprising:
  (a) at least one ground element;
    at least a portion of said at least one ground element being generally coplanar with at least one ground plane;
  (b) at least one substantially planar transceiver element;
    at least a portion of said at least one transceiver element being generally coplanar with at least one transceiver plane;
    a selected said transceiver element of said at least one transceiver element intersecting a selected ground element of said at least one ground element at a respective first end in a respective joint;
    said respective joint having a respective first terminus and a respective second terminus defining a respective joint length;
    a respective first edge of said selected transceiver element departing from said respective first terminus in a respective first arcuate path in a respective first direction from said selected ground element;
    a respective second edge of said selected transceiver element departing from said respective second terminus in a respective second arcuate path generally in said respective first direction;
    said respective first arcuate path extending a respective first path length and terminating at a respective second end of said selected transceiver element distal from said respective first end;
    said respective second arcuate path extending a respective second path length and terminating at said respective second end;
    said respective first arcuate path and said respective second arcuate path being non-intersecting paths along said respective first path length and said respective second path length;
    said respective first edge and said respective second edge terminating in a respective terminal structure at said respective second end;
    said respective first edge and said respective second edge being separated by a respective transverse distance at said respective second end; and
  (c) a feed structure;
    said feed structure conveying said electromagnetic signal intermediate said respective transceiver element and said host device.

23. An antenna for effecting transfer of electromagnetic signals intermediate a host device and a medium adjacent to the antenna;
  the antenna comprising:
  (a) at least one ground element;
  (b) at least one substantially planar transceiver element;
    at least a portion of said at least one transceiver element being generally coplanar with at least one transceiver plane;
    a selected said transceiver element of said at least one transceiver element intersecting a selected ground element of said at least one ground element at a respective first end in a respective joint;
  said respective joint having a respective first terminus and a respective second terminus defining a respective joint length;
    a respective first edge of said selected transceiver element departing from said respective first terminus in a respective first arcuate path in a respective first direction from said selected ground element;

a respective second edge of said selected transceiver element departing from said respective second terminus in a respective second arcuate path generally in said respective first direction;

said respective first arcuate path extending a respective first path length and terminating at a respective second end of said selected transceiver element distal from said respective first end;

said respective second arcuate path extending a respective second path length and terminating at said respective second end;

said respective first arcuate path and said respective second arcuate path being non-intersecting paths along said respective first path length and said respective second path length;

said respective first edge and said respective second edge terminating in a respective terminal structure at said respective second end;

said respective first edge and said respective second edge being separated by a respective transverse distance at said respective second end;

and (c) a feed structure;

said feed structure conveying said electromagnetic signal intermediate said respective transceiver element and said host device.

24. An antenna for effecting transfer of electromagnetic signals intermediate a host device and a medium adjacent to the antenna as recited in claim 23 wherein said at least one ground element is a substantially parabolic ground element.

25. An antenna for effecting transfer of electromagnetic signals intermediate a host device and a medium adjacent to the antenna as recited in claim 23 wherein said at least one ground element is a substantially hemispheric ground element.

* * * * *